: 2,852,505

AMINODEOXYGLYCOSIDOPURINES

Bernard Randall Baker, Birmingham, Ala., and Joseph Peter Joseph, Cliffside Park, and Robert Eugene Schaub, Paramus, N. J., assignors to American Cyanamid Company, New York, N. Y., a corporation of Maine No Drawing. Application October 31, 1955
Serial No. 544,084

22 Claims. (Cl. 260—211.5)

This invention relates to a new class of organic compounds which may be termed aminodeoxyglycosidopurines. The aminodeoxglycosidopurines of this invention may be represented by the following general formula

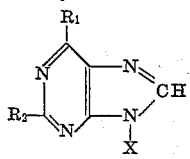

wherein $R_1$ and $R_2$ are members of the group consisting of halogen, hydrogen, alkyl, hydroxyl, alkoxy such as methoxy, ethoxy, propoxy, etc.; aralkyloxy such as benzyloxy; mercapto, alkylmercapto such as methylmercapto, ethylmercapto, etc.; amino, alkylamino such as methylamino, ethylamino, decylamino, etc.; mononuclear arylamino such as p-methoxyphenylamino, etc.; aralkylamino such as benzylamino; heterocyclicalkylamino such as furfurylamino; dialkylamino such as dimethylamino, diethylamino, dipropylamino, etc.; pentamethyleneimino such as piperidyl; oxapentamethyleneimino such as morpholinyl; dialkenylamino such as diallylamino; and cycloalkylamino such as cyclohexylamino, etc.; wherein X is an aminodeoxyglycosido radical, the amino group of which is substituted by a member of the group consisting of hydrogen, acetyl, and phthaloyl radicals, and the exocyclic oxygen atoms of which are substituted by a member of the group consisting of hydrogen, acetyl and benzoyl radicals.

The aminodeoxyglycosidopurines of this invention are related to the well-known glycosidopurines, also commonly referred to as nucleosides, and which comprise essentially two moieties—a sugar and a purine, the purine being attached from its 9-position to the sugar, which in turn is attached either in the α or β configuration from its 1-position to the purine. Glycosidopurines are of singular importance physiologically since the parent nucleoproteins and nucleic acids form the nuclear material of the living cell. The nucleic acids are hydrolyzed to the corresponding nucleotides which are hydrolyzed successively to the glycosidopurines, then to the sugars and purine bases. Yeast nucleic acid for example, yields adenylic acid (a nucleotide) upon hydrolysis, which, in turn, yields adenosine (a glycosidopurine). This compound, when further hydrolyzed, yields the sugar "D-ribose" and the purine "adenine."

It will be observed that the aminodeoxyglycosidopurines, which may also be referred to as aminonucleosides, differ markedly from the known glycosidopurines in that in the former compounds the sugar moiety is an aminosugar, that is one of the hydroxyl groups of the sugar is replaced by an amino group. This change, however, makes a tremendous difference in the activity of the resulting compounds. The glycosidopurines, as typified by adenosine, for example, are inactive chemotherapeutically, whereas the aminocleosides of this invention are valuable therapeutic agents in the treatment in domestic animals, such as cattle, of Trypanosomiasis, a disease caused by the presence in the body of a parasite of the genus Trypanosoma.

The compounds of this invention are admistrable orally or parenterally. The curative dose of 6- dimethylamino-9-(3-amino-3-deoxy-β-D-ribofuranosyl)purine, for example, against Trypanosoma equiperdum in mice is about 5 mg. to 10 mg. per kilogram of body weight, intraperitoneally twice daily for 3½ days after inoculation.

Referring to the above general formula, X represents a glycosido radical such as a pentose or hexose containing an amino group substituted by hydrogen, acetyl or phthaloyl radicals, as stated hereinbefore. Any of the known pentoses or hexoses may be used as the sugar moiety in the above structure such as ribose, arabinose, xylose, lyxose, glucose, allose, altrose, etc.

The pentose and hexose aminodeoxy sugars may be either in the 5-membered furanose form:

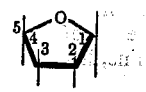

or in the 6-membered pyranose form:

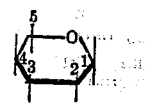

The amino or substituted amino group in the sugar moiety is limited however, to those positions which ordinarily bear a free hydroxyl group in the nucleoside. Thus, in the case of the pentoses only 3 positions are substitutable by an amino group whether they be in pyranose or in furanose form. If the furanose form is used, positions 2, 3 and 5 may hold the amino group, whereas if the pyranose form is used, positions 2, 3 and 4 are substitutable. In the case of the hexoses, four positions are substitutable, namely 2, 3, 5 and 6 if the furanose structure is used, and 2, 3, 4 and 6 if the pyranose structure is used.

The various sugar moieties of the aminodeoxyglycosidopurines may be either in the α or β form, for example, as follows:

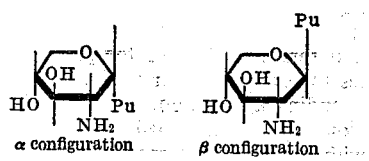

α configuration      β configuration

The novel compounds may be prepared by the condensation of a blocked derivative of a glycoside with a suitably substituted purine. Thus, for example, 2,5-di-O - benzoyl - 3 - phthalimido-3-deoxy-β-D-ribofuranosyl chloride may be condensed with 2-methylmercapto-6-dimethylaminopurine mercuric chloride reaction product in the presence of an inert hydrocarbon solvent to produce 2 - methylmercapto - 6 - dimethylamino-9-(2,5-di-O-benzoyl - 3 - phthalimido - 3-deoxy-β-D-ribofuranosyl)-purine, the methylmercapto group of which may be removed by treatment with Raney nickel and the amino and hydroxy functions of which may then be unblocked to yield the free aminodeoxyglycosidopurine.

The halo-acylated aminosugar to be reacted with the chloromercuripurine may be prepared by reacting hydrogen chloride in an inert solvent such as acetic acid or ether, with the acylated aminosugar to produce the chloro acylated aminosugar. It is to be noted, however, that if the group attached to the amino nitrogen of the sugar is acetyl, the product may precipitate out as the salt because of the basic character of the amide group.

To avoid this, a phthaloyl group may be used on the amino nitrogen in place of the acetyl.

The condensation of a heavy metal salt of a purine with an acylated 1-halo-aminoglycoside as outlined above is preferably carried out in an inert hydrocarbon or inert chlorinated hydrocarbon solvent such as ethylene dichloride, toluene, xylene, or benzene at a temperature of about 75–200° C. to produce a fully acylated aminodeoxyglycosidopurine.

A new and novel method of preparing the desired aminodeoxyglycosidopurines is to treat a mixture containing a heavy metal salt of a purine and an acylated aminosugar with titanium tetrachloride in an inert hydrocarbon or inert halogenated hydrocarbon solvent such as ethylene dichloride at a temperature preferably between 50° and 90° C.

This procedure is particularly useful in those instances where the acetylaminosugar cannot be readily converted to a halo sugar with hydrogen chloride because of the basic character of the amide group.

The acylated aminodeoxyglycosidopurine may be deacylated either selectively or fully. Selective deacylation may be carried out in an alcohol such as ethanol or methanol in the presence of a basic reagent such as ammonia, an organic amine, hydrazine, a metal alkoxide, a quaternary ammonium base, or an inorganic base such as sodium or potassium hydroxide at a temperature of about −5–200° C. Deacylation of the amino function may be carried out in water as a solvent in the presence of a strong base such as barium, sodium or potassium hydroxide or a quaternary ammonium hydroxide at a temperature of about 20–200° C. Barium hydroxide is ordinarily the preferred base.

A particularly preferred procedure for preparing the novel compounds of the present invention forms the subject matter of the copending application of Goldman and Marsico, Serial No. 544,085, filed October 31, 1955. According to the Goldman et al. application, the method therein described utilizes as the starting material an aminodeoxyglycosidopurine which is substituted in the $R_1$ and/or $R_2$ positions by a replaceable group such as halogen, i. e. chlorine, bromine, etc. or alkoxy such as methoxy, ethoxy, etc. The so-substituted aminodeoxyglycosidopurine is reacted with a wide variety of nucleophilic reagents such as ammonia, various amines, inorganic bases, etc., which replace the halogen or alkoxy group by a suitable radical in the $R_1$ and $R_2$ positions such as hydroxyl, mercapto, alkylmercapto, amino, alkylamino, etc., as set out hereinbefore. This novel preparative method forms no part of the present invention as it constitutes the subject matter of the aforesaid Goldman et al. copending application.

The invention will be described in greater detail in conjunction with the following specific examples.

EXAMPLE 1

*2 - methylmercapto - 6 - dimethylamino - 9 - (2,5 - di-O-benzoyl - 3 - acetamido - 3 - deoxy-β-D-ribofuranosyl)-purine*

To a solution of 5.1 g. of methyl-2,5-di-O-benzoyl-3-acetamido-3-deoxy-β-D-ribofuranoside in 100 cc. of methanol was added 1.8 cc. of 1 N methanolic sodium methoxide. After being refluxed for 30 minutes, the solution was evaporated to dryness in vacuo leaving methyl-3-acetamido-3-deoxy-β-D-ribofuranoside as a glass. This residue was dissolved in 50 cc. of dry pyridine and treated with 5.1 cc. of benzoyl chloride at 5–7°. After 68 hours at 3° in a closed container, the mixture was diluted with 200 cc. of water and extracted with three 50 cc. portions of chloroform. The combined extracts, washed with aqueous sodium bicarbonate, dried with magnesium sulfate and clarified with activated charcoal, were evaporated to dryness in vacuo. Crystallization of the residue from 14 cc. of benzene by the addition of heptane to turbidity gave 4.7 g. (64%) of white crystals of methyl-2,5 - di - O - benzoyl - 3 - acetamido - 3 - deoxy - β - D-ribofuranoside, M. P. 139–141°. This compound is soluble in chloroform, pyridine and hot benzene, but is insoluble in water or petroleum ether. To a solution of 5.0 g. of methyl-2,5-di-O-benzoyl-3-acetamido-3-deoxy-β-D-ribofuranoside in 50 cc. of acetic acid was added 15 cc. of concentrated hydrochloric acid. The solution was stirred in a 50° bath for 25 minutes, then diluted with 175 cc. of iced water and extracted with 175 cc. of chloroform in three portions. The combined extracts, washed with aqueous sodium bicarbonate and dried with magnesium sulfate, were evaporated in vacuo. Crystallization of the residue from 10 cc. of ethyl acetate by addition of heptane to turbidity gave 2.5 g. (52%) of 2,5 - di - O - benzoyl - 3 - acetamido - 3 - deoxy-D-ribose, M. P. 144–147°. Recrystallization from the same solvents afforded pure material, M. P. 153–154°, $[\alpha]_D$+108° (pyridine). This compound gives a positive Benedicts test and is insoluble in water and petroleum ether, but is soluble in pyridine, hot chloroform or hot benzene.

A solution of 2.5 g. of 2,5-di-O-benzoyl-3-acetamido-D-ribose in 5 cc. of reagent pyridine and 5 cc. of acetic anhydride was heated on the steam-bath for 1 hour, then diluted with 25 cc. of iced water and extracted with 55 cc. of chloroform in three portions. The combined extracts, dried with magnesium sulfate, were evaporated to dryness in vacuo leaving 2.7 g. (98%) of a gummy solid, M. P. 127–131°, which was a mixture of α- and β-1-O-acetyl - 2,5 - di-O-benzoyl - 3 - acetamido - 3 - deoxy-D-ribofuranoside. Recrystallization from 16 cc. of 1:1 ethyl acetate:heptane gave 1.5 g. (54%) of one of the isomers, M. P. 149–151°. Further recrystallation from the same solvent gave white crystals, M. P. 152–154°, $[\alpha]_D^{24}$+63° (pyridine). This compound is soluble in chloroform or pyridine, but insoluble in water or heptane.

The filtrate from the 1.5 g. gave on evaporation 1.1 g. (40%) of the other isomer as a gum which did not crystallize and had $[\alpha]_D^{24}$+84° (2% in pyridine).

To a solution of 990 mg. of 1-O-acetyl-2,5-di-O-benzoyl-3-acetamido-3-deoxy-D-ribofuranoside (α, β mixture, M. P. 127–131°) in 8.5 cc. of ethylene dichloride was added a solution of 0.30 cc. of titanium tetrachloride in 4.4 cc. of ethylene dichloride. After being refluxed for 1 hour, the solution was added to a stirred mixture of 1.25 g. of 2-methylmercapto-6-dimethylaminopurine mercuric chloride reaction product, 1.35 g. of diatomaceous earth and 90 cc. of ethylene dichloride which had been previously dried by distilling off 20 cc. of solvent. The mixture was stirred and refluxed for 18 hours, then treated with 45 cc. of water and stirred without further heating for 15 minutes. The mixture was filtered and the solids washed with hot chloroform. The separated organic layer from the combined filtrate and washings was evaporated to dryness in vacuo leaving a glass. This was dissolved in 25 cc. of chloroform and washed with 25 cc. of 30% aqueous potassium iodide, then water. Dried with magnesium sulfate and clarified with activated charcoal, the solution was evaporated to dryness in vacuo leaving 1.33 g. (100%) of a glass which had $\lambda_{max.}$ 282.5 m$\mu$ ($\epsilon$17,000) in methyl Cellosolve corresponding to 94% purity of 2-methylmercapto - 6 - dimethylamino - 9 - (2,5 - di - O-benzoyl - 3 - acetamido - 3 - deoxy - β - D - ribofuranosyl)-purine. The lower peak was masked by benzoate absorption at 230 m$\mu$. This compound is insoluble in water, alcohol and benzene, but is soluble in methyl Cellosolve, pyridine or chloroform.

EXAMPLE 2

*6-dimethylamino-9-(2,5-di-O-benzoyl-3-acetamido-3-deoxy-β-D-ribofuranosyl)purine*

A solution of 1.28 g. of 2-methylmercapto-6-dimethylamino - 9 - (2,5 - di - O - benzoyl - 3 - acetamido - 3-deoxy-β-D-ribofuranosyl)purine in 75 cc. of methyl Cellosolve was stirred with 2 teaspoons of desulfurizing Raney nickel on the steam-bath for 40 minutes. The hot solution was filtered through diatomaceous earth and the catalyst washed several times with hot methyl Cellosolve. Evaporation of the combined filtrate and washings to dryness in vacuo left 0.705 g. (60%) of 6-dimethylamino-9-(2,5 - di - O - benzoyl - 3 - acetamido - 3 - deoxy - $\beta$ - D-ribofuranosyl)purine as a glass which had $\lambda_{max.}$ 275 m$\mu$ ($\epsilon$16,900) in methyl Cellosolve corresponding to 90% purity. This compound is insoluble in water or cold alcohol, but is soluble in methyl Cellosolve, pyridine and chloroform.

EXAMPLE 3

*6-dimethylamino-9-(3-acetamido-3-deoxy-$\beta$-D-ribofuranosyl)purine*

A solution of 690 mg. of 6-dimethylamino-9-(2,5-di-O - benzoyl - 3 - acetamido - 3 - dexoy - $\beta$ - D - ribofuranosyl)purine in 15 cc. of methanol and 0.14 cc. of 1 N methanolic sodium methoxide was refluxed for 30 minutes, then evaporated to dryness in vacuo. The residue was crystallized from 3 cc. of alcohol with the aid of activated charcoal; yield, 130 mg. (30%) of 6-dimethylamino-9-(3 - acetamido - 3 - deoxy - $\beta$ - D - ribofuranosyl)purine, M. P. 184–186°. Recrystallization from alcohol gave white crystals, M. P. 187–188°, $[\alpha]_D$ —9.9° (3% in pyridine). This compound is soluble in water, pyridine and hot alcohol, but is insoluble in ethyl acetate, benzene, or cold alcohol.

EXAMPLE 4

*6-dimethylamino-9-(3-amino-3-deoxy-$\beta$-D-ribofuranosyl)purine*

A solution of 100 mg. of 6-dimethylamino-9-(3-acetamido-3-deoxy-$\beta$-D-ribofuranosyl)purine in 5 cc. of 0.5 N barium hydroxide was heated on the steam-bath for 1 hour. The barium hydroxide was precipitated with excess carbon dioxide. The filtrate from the barium carbonate was evaporated to dryness under reduced pressure. The residue was dissolved in 3 cc. of water, filtered and the solution evaporated. Trituration of the residue with 3 cc. of ethyl acetate gave 70 mg. (80%) of 6-dimethylamino-9-(3-amino-3-deoxy-$\beta$-D-ribofuranosyl)purine, M. P. 209–211°. This compound can be recrystallized from absolute alcohol forming white crystals, M. P. 215–216°, $[\alpha]_D^{25}$ —24.6° (H$_2$O);

$\lambda_{max.}^{pH1}$ 269 m$\mu$ ($\epsilon$18,600); $\lambda_{max.}^{pH7}$ 276 m$\mu$ ($\epsilon$18,900); $\lambda_{max.}^{pH14}$ 275 m$\mu$ ($\epsilon$17,000)

This aminonucleoside is soluble in water, and somewhat soluble in dimethylformamide and hot alcohol, but insoluble in chloroform, ether or benzene.

EXAMPLE 5

*2-methylmercapto-6-dimethylamino-9-(2-acetamido-2-deoxy-3,4,6-tri-O-acetyl-$\beta$-D-glucopyranosyl)purine*

A solution of 6.2 g. of 1,3,4,6-tetra-O-acetyl-2-acetamido-2-deoxy-$\beta$-D-glucopyranoside (Ber., 64, 975 (1931)) in 104 cc. of dry ether saturated with hydrogen chloride at 0° and 18.7 cc. of acetic anhydride was allowed to stand in a stoppered flask at 3° for 3 days. The volatile material was removed in vacuo (bath 15°). The residual solution was dissolved in 75 cc. of chloroform, and washed with excess ice-cold saturated sodium bicarbonate solution, dried with magnesium sulfate and evaporated to dryness in vacuo. The residue was crystallized from dry ether to give 5.0 g. (86%) of white crystals of 1-chloro-2-acetamido-2-deoxy-3,4,6-tri-O-acetyl-$\alpha$-D-glucopyranoside, M. P. 125–126° dec. This compound is soluble in acetone, chloroform and acetic acid, but insoluble in water, petroleum ether or cold ether.

A stirred mixture of 6.5 g. of 2-methylmercapto-6-dimethylaminopurine mercuric chloride reaction product, 8.0 g. of diatomaceous earth and 500 cc. of toluene was distilled until anhydrous. After the addition of 6.7 g. of 1 - chloro - 2 - acetamido - 2 - deoxy - 3,4,6 - tri - O - acetyl-$\alpha$-D-glucopyranoside, the mixture was refluxed with stirring for 20 hours, then filtered hot. The filter cake was thoroughly washed with 150 cc. of hot alcohol in portions. The combined filtrate and washings were evaporated to dryness in vacuo. The residue was dissolved in 60 cc. of chloroform and 30 cc. of 30% potassium iodide by warming. Some insoluble material was removed by filtration. The organic solution, dried with magnesium sulfate, was evaporated to dryness in vacuo. Crystallization from 10 cc. of methanol gave 3.7 g. (47%) of 2-methylmercapto - 6 - dimethylamino - 9 - (2 - acetamido - 2 - deoxy - 3,4,6 - tri - O - acetyl - $\beta$ - D - glucopyranosyl)purine, M. P. 231–233°. Recrystallization from absolute alcohol afforded white crystals, M. P. 238–240°, $[\alpha]_D^{24}$ +8.5° (1.8% in chloroform). This compound showed the following absorption maxima (m$\mu$) in 10% alcohol:

pH1, $\lambda_{max.}$ 242.5 ($\epsilon$17,900), $\lambda_{max.}$ 277.5 ($\epsilon$19,300); pH7, $\lambda_{max.}$ 249 ($\epsilon$26,700), $\lambda_{max.}$ 284 ($\epsilon$18,800); pH14, $\lambda_{max.}$ 250 ($\epsilon$26,700), $\lambda_{max.}$ 286 ($\epsilon$18,500)

EXAMPLE 6

*2-methylmercapto-6-dimethylamino-9-(2-acetamido-2-deoxy-$\beta$-D-glucopyranosyl)purine*

A mixture of 250 mg. of 2-methylmercapto-6-dimethylamino - 9 - (2 - acetamido - 2 - deoxy - 3,4,6 - tri - O - acetyl-$\beta$-D-glucopyranosyl)purine, 5 cc. of methanol and 0.05 cc. of 1 N methanolic sodium methoxide was refluxed ½ hour, solution taking place at the B. P. The solution was evaporated to dryness under reduced pressure. Trituration of the residue with methanol gave 160 mg. (84%) of 2-methylmercapto-6-dimethylamino-9-(2-acetamido-2-deoxy-$\beta$-D-glucopyranosyl)purine, M. P. 245–247° dec. This compound is insoluble in cold water, alcohol or benzene, but is soluble in hot water or hot methanol.

EXAMPLE 7

*6-dimethylamino-9-(2-acetamido-2-deoxy-3,4,6-tri-O-acetyl-$\beta$-D-glucopyranosyl)purine*

A solution of 800 mg. of 2-methylmercapto-6-dimethylamino-9-(2-acetamido-2-deoxy-3,4,6-tri-O-acetyl - $\beta$ - D - glucopyranosyl)pyrine in 100 cc. of absolute alcohol was refluxed with about 1 teaspoon of Raney nickel for 2 hours. The mixture was filtered through diatomaceous earth and the catalyst washed with alcohol. The combined filtrate and washings were evaporated to dryness under reduced pressure leaving 590 mg. (81%) of 6-dimethylamino-9-(2-acetamido-2-deoxy - 3,4,6-tri-O-acetyl-$\beta$-D-glucopyranosyl)pyrine as a glass which was nearly pure as shown by its U. V. (in m$\mu$) spectrum: pH1, $\lambda_{max.}$ 267 ($\epsilon$18,200); pH7, $\lambda_{max.}$ 275 ($\epsilon$18,200); pH14, $\lambda_{max.}$ ($\epsilon$17,400). This compound is soluble in alcohol, chloroform or acetone, but is insoluble in water or petroleum ether.

EXAMPLE 8

*6-dimethylamino-9-(2-acetamido-2-deoxy-$\beta$-D-glucopyranosyl)pyrine*

A solution of 570 mg. of 6-dimethylamino-9-(2-acetamido-2-deoxy-3,4,6-tri-O-acetyl-$\beta$ - D - glucopyranosyl)-purine in 12 cc. of methanol and 0.12 cc. of 1 N methanolic sodium methoxide was refluxed for 1 hour, then evaporated to dryness under reduced pressure leaving 437 mg. (100%) of 6-dimethylamino-9-(2-acetamido-2-deoxy-$\beta$-D-glucopyranosyl)purine as a white amorphous powder, M. P. about 170°. This compound is soluble in water and alcohol, but insoluble in benzene or ethyl acetate.

EXAMPLE 9

*2-methylmercapto - 6 - dimethylamino - 9 - (2,5 - di - O-benzoyl-3-acetamido - 3-deoxy-$\alpha$-D-arabinofuranosyl)-purine*

To a solution of 9.6 g. of methyl-3-acetamido-3-deoxy-$\beta$-D-arabinofuranoside (case 14,293) in 96 cc. of reagent pypridine was added 13.6 cc. of benzoyl chloride at 5–9°. After 3 days at 3° in a closed container, the mixture was diluted with 400 cc. of iced-water and extracted with three 100 cc. portions of methylene chloride. The combined extracts, washed with aqueous sodium bicarbonate and dried with magnesium sulfate, were evaporated to dryness under reduced pressure leaving 21.5 g. of methyl 2,5-di-O-benzoyl-3-acetamido-3-deoxy-α-D-arabinofuranoside as a syrup. This compound is soluble in alcohol, acetone and chloroform, but insoluble in water.

A solution of 21.5 g. of methyl 2,5-di-O-benzoyl-3-acetamido-3-deoxy-α-D-arabinofuranoside in 215 cc. of acetic acid and 64 cc. of concentrated hydrochloric acid was stirred at 50° for 30 minutes, then diluted with 800 cc. of iced-water. The mixture was extracted with three 150 cc. portions of chloroform. The combined extracts, washed wtih excess aqueous sodium bicarbonate and dried with magnesium sulfate, were evaporated to dryness under reduced pressure. Crystallization from 60 cc. of benzene gas 8.5 g. (41%) of white crystals of 2,5-di-O-benzoyl - 3 - acetamido - 3 - deoxy - D - arabinose, M. P. 152–153°, $[\alpha]_D$ —25.6° (chloroform). This compound gives a positive Benedicts' test, is soluble in acetone, chloroform and pyridine, but is insoluble in water and cold benzene.

A solution of 4 g. of 2,5-di-O-benzoyl-3-acetamido-3-deoxy-D-arabinose in 20 cc. of pyridine and 20 cc. of acetic anhydride was heated in the steam-bath for 1 hour, then diluted with 100 cc. of iced-water. The mixture was extracted with 100 cc. of chloroform in three portions. Dried with magnesium sulfate, the combined extracts were evaporated to dryness under reduced pressure leaving 4.8 g. of a syrup which was a mixture of α- and β-1-O-acetyl-2,5-di-O-benzoyl - 3 - acetamido - 3- deoxy-D-arabinofuranoside. Crystallization from 17 cc. of benzene by addition of heptane to turbidity gave 3.3 g. (75%) of one of the isomers, M. P. 119–121°. Recrystallization from the same solvents afforded white crystals, M. P. 121–122°, $[\alpha]_D^{24}$+29.1° (chloroform). This compound is soluble in chloroform and pyridine, but insoluble in water or heptane.

Treatment of 3.3 g. of 1-O-acetyl-2,5-di-O-benzoyl-3-acetamido-3-deoxy-D-arabinofuranoside (M. P. 119–121°) with titanium tetrachloride in ethylene chloride followed by coupling with 4.15 g. of 2-methylmercapto-6-dimethylaminopyrine mercuric chloride reaction product as described in Example 1 gave 3.8 g. (86%) of 2-methylmercapto - 6 - dimethylamino-9-(2,5-di-O-benzoyl-3-acetamido-3-deoxy-α-D-arabinofuranosyl)purine as a glass. This compound had $\lambda_{max.}$ 282.5 mμ in methyl Cellosolve.

EXAMPLE 10

*6-dimethylamino-9-(2,5 - di - O - benzoyl-3-acetamido-3-deoxy-α-D-arabinofuranosyl)purine*

Desulfurization of 3.8 g. of 2-methylmercapto-6-dimethylamino-9-(2,5-di - O-benzoyl-3-acetamido-3-deoxy-α-D-arabinofuranosyl)purine in 225 cc. of methyl Cellosolve with 4 teaspoons of Raney nickel as described in Example 1 gave 2.5 g. (71%) of 6-dimethylamino-9-(2,5-di-O-benzoyl-3-acetamido-3-deoxy - α - D - arabinofuranosyl)purine as a glass which was 90% pure as shown by its ultraviolet absorption spectra in methyl Cellosolve: $\lambda_{max.}$ 275 mμ (ε16,750).

EXAMPLE 11

*6-dimethylamino-9-(3-acetamido-3-deoxy - α - D-arabinofuranosyl)purine*

A solution of 2.5 g. of 6-dimethylamino-9-(2,5-di-O-benzoyl-3 - acetamido - 3 - deoxy-α-D-arabinofuranosyl)-purine in 59 cc. of methanol and 0.96 cc. of 1 N methanolic sodium methoxide was refluxed for 50 minutes, then evaporated to dryness under reduced pressure. Crystallization from ethyl acetate gave white crystals of 6-dimethylamino-9-(3-acetamido-3-deoxy-α - D - arabinofuranosyl)purine, M. P. 186–187°. Recrystallization from ethyl acetate-alcohol-heptane gave white crystals, M. P. 189–191°, $[\alpha]_D$+102° (water). This compound is soluble in water and alcohol, but is insoluble in benzene or heptane.

EXAMPLE 12

*6-dimethylamino-9-(2,5-di-O - acetyl - 3 - acetamido - 3-deoxy-α-D-ribofuranosyl)purine*

To a solution of 500 mg. of 6-dimethylamino-9-(3-acetamido-3-deoxy-α-D-arabinofuranosyl)purine in 10 ml. of pyridine cooled in an ice-bath to 5° was added 0.5 ml. of methanesulfonyl chloride. After 48 hours at room temperature protected from moisture, the mixture was diluted with 50 ml. of water and extracted with four 25-ml. portions and then three 20-ml. portions of chloroform. The combined extracts were washed with aqueous sodium bicarbonate, dried with magnesium sulfate, and evaporated to dryness under reduced pressure leaving 622 mg. (85%) of 6-dimethylamino-9-(2,5-di-O-mesyl-3-acetamido-3-deoxy-α-D-arabinofuranosyl)purine as a glassy solid. This compound is soluble in alcohol, chloroform and acetone, but insoluble in water or petroleum ether.

A mixture of 622 mg. of 6-dimethylamino-9-(2,5-di-O-mesyl-3-acetamido-3-deoxy-α-D-arabinofuranosyl)purine, 0.50 g. of anhydrous sodium acetate and 5.3 ml. of 95% methyl Cellosolve was refluxed for 24 hours. The cooled solution was filtered from sodium methanesulfonate, and the filtrate was evaporated to dryness under reduced pressure. The residue was heated on the steam-bath with 4 ml. of pyridine and 4 ml. of acetic anhydride for 1 hour. The mixture was diluted with 20 ml. of water and extracted with three 15-ml. portions of chloroform. The combined extracts, dried with magnesium sulfate, were evaporated under reduced pressure leaving 450 mg. (81%) of 6-dimethylamino-9-(2,5-di-O-acetyl-3-acetamido-3-deoxy-α-D-ribofuranosyl)purine as a glass.

EXAMPLE 13

*6-dimethylamino-9-(3-acetamido-3-deoxy-α-D-ribofuranosyl)purine*

To a solution of 400 mg. of 6-dimethylamino-9-(2,5-di-O-acetyl-3-acetamido-3-deoxy-α-D - ribofuranosyl)purine in 8 ml. of dry methanol was added 0.18 ml. of 1 N methanolic sodium methoxide. The solution was refluxed 30 minutes, then evaporated to dryness under reduced pressure. Trituration with ethyl acetate gave 250 mg. (82%) of 6-dimethylamino-9-(3-acetamido-3-deoxy-α-D-ribofuranosyl)purine, M. P. 233–235° C. Recrystallization from methanol afforded white crystals, M. P. 239–240° C., $[\alpha]_D^{25}$+115° (H₂O). This compound is somewhat soluble in water, hot methanol and hot ethanol, slightly soluble in cold alcohols, but insoluble in ethyl acetate or benzene.

EXAMPLE 14

*6-dimethylamino-9-(3-amino-3-deoxy-α-D-ribofuranosyl)purine*

Hydrolysis of 100 mg. of 6-dimethylamino-9-(3-acetamido-3-deoxy-α-D-ribofuranosyl)purine with barium hydroxide as described for 6-dimethylamino-9-(3-acetamido-3-deoxy-β-D-ribofuranosyl)purine in Example 4 gave 70 mg. (80%) of white crystals of 6-dimethylamino-9-(3-amino-3-deoxy-α-D-ribofuranosyl)purine, M. P. 235° C. (dec.). This compound is soluble in water and alcohol, but insoluble in ether or ethyl acetate.

EXAMPLE 15

*2-methylmercapto-6-dimethylamino-9-(3-acetamido-3-deoxy-β-D-ribofuranosyl)purine*

Debenzoylation of 2.6 g. of 2-methylmercapto-6-dimethylamino-9-(2,5-di-O-benzoyl-3-acetamido-3-deoxy-β-D-ribofuranosyl)purine (Example 1) with methanolic sodium methoxide as described for 6-di-methylamino-9-(2,5-di-O-benzoyl-3-acetamido-3-deoxy-β-D-ribofuranosyl)purine in Example 3 gave 2-methylmercapto-6-dimethylamino-9-(3-acetamido-3-deoxy-β-D-ribofuranosyl)purine as a glass, soluble in water and alcohol, but insoluble in benzene.

EXAMPLE 16

*6-benzamido-9-(2,5-di-O-benzoyl-3-acetamido-3-deoxy-α and β-D-ribofuranosyl)purine*

A mixture of 4.4 g. of 6-benzamidopurine mercuric chloride reaction product (J. Am. Chem. Soc., 23, 1650 (1951)), 18.2 g. of diatomaceous earth, 10.7 g. of 1-O-acetyl-2,5-di-O-benzoyl-3-acetamido-3-deoxy-D-ribofuranoside and 1050 ml. of ethylene dichloride was freed from water by distillation of 75 ml. of solvent. After addition of 3.27 ml. of titanium tetrachloride in 25 ml. of ethylene dichloride, the mixture was refluxed and stirred for 17 hours. To the mixture was added 500 ml. of water and 100 ml. of 10% sodium hydroxide. The mixture was filtered through 25 g. of diatomaceous earth. The filter cake was washed with three 100-ml. portions of hot chloroform. The organic layer was separated from the combined filtrate and washings, dried with magnesium sulfate, and evaporated to dryness under reduced pressure. A solution of the dried residue in 100 ml. of chloroform was washed with 50 ml. of 30% aqueous potassium iodide, then with water. Dried with magnesium sulfate, the washed chloroform solution was evaporated to dryness under reduced pressure, leaving 8.2 g. (55%) of a mixture of 6-benzamido-9-(2,5-di-O-benzoyl-3-acetamido-3-deoxy-α and β-D-ribofuranosyl)purine. This mixture is soluble in alcohol or chloroform, but insoluble in water or petroleum ether.

EXAMPLE 17

*6-amino-9-(3-acetamido-3-deoxy-α-D-ribofuranosyl)-purine*

To a solution of 8.2 g. of 6-benzamido-9-(2,5-di-O-benzoyl-3-acetamido-3-deoxy-α and β-D-ribofuranosyl)purine in 175 ml. of methanol was added 2.86 ml. of 1 N methanolic sodium methoxide. The solution was refluxed for 30 minutes. After about 20 minutes, white crystals began to separate. The crystals of 6-amino-9-(3-acetamido-3-deoxy-α-D-ribofuranosyl)purine were collected; yield, 0.93 g. (23%), M. P. 279° C., $[\alpha]_D^{24}$ +60° (0.1 N HCl). This compound is insoluble in alcohol, water or acetone, but is soluble in dilute acids or hot pyridine.

EXAMPLE 18

*6-amino-9-(3-acetamido-3-deoxy-β-D-ribofuranosyl)-purine*

The filtrate from the α-isomer (Example 17) was evaporated to dryness under reduced pressure. Trituration of the residue with 15 ml. of alcohol gave 0.88 g. (21%) of 6-amino-9-(3-acetamido-3-deoxy-β-D-ribofuranosyl)-purine, M. P. 234–244° C. (dec.), $[\alpha]_D^{25}$ +11.6° (0.1 N HCl). This compound is somewhat soluble in hot alcohol or water, but is insoluble in ethyl acetate or benzene.

EXAMPLE 19

*6-amino-9-(3-amino-3-deoxy-β-D-ribofuransoyl)purine*

Hydrolysis of 200 mg. of 6-amino-9-(3-acetamido-3-deoxy-β-D-ribofuranosyl)purine with barium hydroxide as described in Example 4 gave 130 mg. (75%) of 6-amino-9-(3-amino-3-deoxy-β-D-ribofuranosyl)purine as a glass, soluble in water and alcohol, but insoluble in ethyl acetate or benzene.

EXAMPLE 20

*6-dimethylamino-9-(3-phthalimido-3-deoxy-β-D-ribofuranosyl)purine*

A solution of 500 mg. of 6-dimethylamino-9-(3-amino-3-deoxy-β-D-ribofuranosyl)purine and 278 mg. of phthalic anhydride in 3 ml. of dimethylformamide was refluxed for 30 minutes, then poured into 30 ml. of water. The crystals of 6-dimethylamino-9-(3-phthalimido-3-deoxy-β-D-ribofuranosyl)purine were collected; yield, 610 mg. (85%), M. P. 274–275° C. (dec.). Recrystallization from alcohol gave white crystals, M. P. 276–277° C. (dec.). This compound is somewhat soluble in hot alcohol, soluble in dimethylformamide or pyridine, but insoluble in cold alcohol, water or benzene.

EXAMPLE 21

*6-chloro-chloromercuripurine and bis (6-chloropurinyl) mercury*

50 ml. of 0.4 N sodium hydroxide was heated to 75° C. and 3.091 g. of 6-chlorpurine was added to produce a clear solution. A hot solution of 5.430 g. of mercuric chloride in 15 ml. of ethanol was immediately added with stirring to produce colorless crystals. After chilling the crystals were removed by filtration, washed with water and dried overnight at 100° C. The yield of light tan crystals, analyzing for 15% 6-chloro-chloromercuripurine and 85% bis(6-chloropurinyl)mercury, was 96%.

EXAMPLE 22

*6-chloro-9-(2,5-di-O-benzoyl-3-phthalimido-3-deoxy-β-D-ribofuranosyl)purine*

To a stirred, refluxing suspension of 6.84 g. of a mixture of 82.5% bis(6-chloropurinyl)mercury and 17.5% 6-chloro-chloromercuripurine in 350 ml. of anhydrous xylene, was added a hot solution of 11.86 g. of 2,5-di-O-benzoyl-3-phthalimido-3-deoxy-β-D-ribofuranosyl chloride in 125 ml. of anhydrous xylene. The resulting suspension was refluxed and stirred for 5 hours and then while hot filtered through Celite. The filter cake was washed with hot chloroform and the combined filtrate and wash were washed twice with 40 ml. portions of 30% potassium iodide and then with water. After drying over magnesium sulfate the solution was concentrated under reduced pressure to give 13.36 g. of 6-chloro-9-(2,5-di-O-benzoyl-3-phthalimido-3-deoxy-D-ribofuranosyl)purine. Recrystallization from ethyl acetate-hexane gave 7.18 g. of colorless crystals of 6-chloro-9-(2,5-di-O-benzoyl-3-phthalimido-3-deoxy-β-D-ribofuranosyl)purine (containing ½ mol of ethyl acetate), which sinters at 76–77° C. to an opaque glass, melts at 100–105° C. to a clear glass; $[\alpha]_D^{24}$ −60.9° (chloroform), $\lambda_{max}^{0.1\,N\,HCl}$ 263 mμ (ε12,100); $\lambda_{max}^{ethanol}$ 263 mμ (ε10,700); $\lambda_{max}^{0.1\,N\,NaOH}$ 263 mμ (ε10,700)

EXAMPLE 23

*6-chloro-9-(2,5-di-O-benzoyl-3-acetamido-3-deoxy-D-ribofuranosyl)purine*

To a stirred mixture of 7.45 g. of 1-O-acetyl-2,5-di-O-benzoyl-3-acetamido-3-deoxy-D-ribofuranose and 5.85 g. of a mixture of 82.5% bis(6-chloropurinyl)mercury and 17.5% of 6-chloro-chloromercuripurine in 325 ml. of anhydrous ethylene dichloride at room temperature, was added dropwise 2.32 ml. of titanium tetrachloride. The resulting suspension was stirred and refluxed for 20 hours. The stirred mixture was chilled and 300 ml. of cold 0.1 N hydrochloric acid added in four portions. Stirring was continued for 15 minutes at room temperature and the mixture was filtered. The precipitate was washed well with hot chloroform and the combined filtrate and washings were shaken well and the layers separated. The organic phase was washed with 60 ml. of water, 60 ml. of 30% potassium iodide, and 60 ml. of water and dried over magnesium sulfate. The dried organic solution was evaporated under reduced pressure to yield 7.77 g. (85%) of 6-chloro-9-(2,5-di-O-benzoyl-3-acetamido-3-deoxy-D-ribofuranosyl)purine as a light tan glass; $[\alpha]_D^{24.5}$ +39.2° (ethanol);

$\lambda_{max.}^{0.1\,N\,HCl}$ 233 m$\mu$ ($\epsilon$27,500), 265 m$\mu$ ($\epsilon$7,890); $\lambda_{max.}^{ethanol}$ 230 m$\mu$ ($\epsilon$28,400), 264 m$\mu$ ($\epsilon$8,300); $\lambda_{max.}^{0.1\,N\,NaOH}$ 265 m$\mu$ ($\epsilon$7,840)

EXAMPLE 24

*6 - dimethylamino - 9 - (3 - acetamido - 3 - deoxy - β - D-ribofuranosyl)purine*

A mixture of 0.536 g. of 6-chloro-9-(2,5-O-benzoyl-3-acetamido-3-deoxy-D-ribofuranosyl)purine (prepared as in Example 23), 1 ml. of dimethylamine and 10 ml. of anhydrous methanol was heated in a sealed tube for 2 hours on a steam-bath. The resulting red-brown solution was evaporated to dryness under reduced pressure and the residual gum dissolved in aqueous ethanol and evaporated to dryness under reduced pressure. The residual gum was dissolved in 40 ml. of 50% methanol and 38.4 ml. of the resulting solution stirred with Amberlite IRA-400 (OH) resin. The resin was removed by filtration and the filtrate evaporated under reduced pressure to yield 0.34 g. (96%) of 6-dimethylamino-9-(3-acetamido-3-deoxy-D-ribofuranosyl)purine as a tan glass. Crystallization from 3A alcohol gave 0.165 g. (52%) of colorless crystals, M. P. 186–189° C., of 6-dimethylamino-9-(3-acetamido-3-deoxy-β-D-ribofuranosyl)purine; $[\alpha]_D^{25}$ −8.1° (pyridine);

$\lambda_{max.}^{0.1\,N\,HCl}$ 267 m$\mu$ ($\epsilon$17,700); $\lambda_{max.}^{ethanol}$ 275 m$\mu$ (17,500); $\lambda_{max.}^{0.1\,N\,NaOH}$ 275 m$\mu$ (17,800)

EXAMPLE 25

*6 - diethylamino - 9 - (3 - acetamido - 3 - deoxy - β - D-ribofuranosyl)purine*

A mixture of 3.684 g. of 6-chloro-9-(2,5-di-O-benzoyl-3-acetamido-3-deoxy-D-ribofuranosyl)purine (prepared as in Example 23), 7.2 ml. of diethylamine and 35 ml. of anhydrous methanol was heated in a sealed tube for 2 hours on a steam-bath. The resulting dark red solution was evaporated to dryness under reduced pressure and the residue was evaporated to dryness under reduced pressure several times with aqueous ethanol. The dark brown crystalline residue was dissolved in 160 ml. of 50% methanol and the resulting solution stirred with Amberlite IRA-400 (OH) resin. The resin was removed by filtration and the filtrate evaporated to dryness under reduced pressure to yield 1.944 g. (78%) of 6-diethylamino-9-(3-acetamido-3-deoxy-D-ribofuranosyl)purine as a brown solid, M. P. 180-192° C. Recrystallization from 60 ml. of 3:1 ethyl acetate:anhydrous ethanol with the aid of Norit gave 1.165 g. (47%) of 6-diethylamino-9-(3-acetamido-3-deoxy-β-D-ribofuranosyl)purine as colorless crystals, M. P. 207–210° C. Recrystallization from 2:3 ethyl acetate:3A alcohol gave colorless crystals, M. P. 214.5–215° C., $[\alpha]_D^{24.5}$ −26.0° (ethanol);

$\lambda_{max.}^{0.1\,N\,HCl}$ 269 m$\mu$ ($\epsilon$19,400); $\lambda_{max.}^{ethanol}$ 277.5 m$\mu$ ($\epsilon$19,400); $\lambda_{max.}^{0.1\,N\,NaOH}$ 278 m$\mu$ ($\epsilon$19,800)

EXAMPLE 26

*6-diethylamino-9-(3-amino-3-deoxy-β-D-ribofuranosyl)purine*

A solution of 0.500 g. of 6-diethylamino-9-(3-acetamido-3-deoxy-β-D-ribofuranosyl)purine (prepared as in Example 25) in 50 ml. of 5% barium hydroxide was heated on a steam-bath for 1 hour. Excess carbon dioxide was added and the precipitated barium carbonate removed by filtration. The filtrate was evaporated to dryness under reduced pressure and the crystalline residue was dissolved in 15 ml. of 50% methanol. This solution was passed through a column of 10 g. of Amberlite IRC-50 (H) resin and the column washed with four 100-ml. portions of 50% methanol; the last eluate having negligible absorption at 277.5 m$\mu$. The combined eluates were evaporated to dryness under reduced pressure to yield 0.287 g. of recovered starting material. The resin column was washed with two 100-ml. and two 50-ml. portions of 1:1 methanol:0.6 N ammonium hydroxide, the last eluate having negligible absorption at 275 m$\mu$. The combined eluates were evaporated to dryness under reduced pressure to yield 0.133 g. (30%) of 6- diethylamino-9-(3-amino-3-deoxy-β-D - ribofuranosyl)purine as tan crystals, M. P. 165–175° C. The recovered starting material was hydrolyzed with 5% barium hydroxide as above to yield an additional 0.085 g. (19%) of 6-diethylamino - 9 - (3-amino-3-deoxy-β-D-ribofuranosyl)-purine as buff-colored crystals, M. P. 176–180° C. Twenty percent of the starting material was recovered. The product was recrystallized from 1:1 ethyl acetate:ethanol with the aid of Norit to yield colorless crystals, M. P. 181–183° C.;

$[\alpha]_D^{24.5}$ −45.8° (ethanol); $\lambda_{max.}^{0.1\,N\,HCl}$ 268 m$\mu$ ($\epsilon$19,700); $\lambda_{max.}^{ethanol}$ 277 m$\mu$ ($\epsilon$19,400); $\lambda_{max.}^{0.1\,N\,NaOH}$ 277.5 m$\mu$ ($\epsilon$20,000)

EXAMPLE 27

*6-methylamino-9-(3-amino-3-deoxy-β-D-ribofuranosyl)purine*

A mixture of 6.68 g. of 6-chloro-9-(2,5-di-O-benzoyl-3-phthalimido-3-deoxy-β - D-ribofuranosyl)purine (containing one-half mole of ethyl acetate and prepared as in Example 22), 4 g. of methylamine and 85 ml. of anhydrous methanol was heated in a sealed tube for 4 hours on a steam-bath. The resulting solution was chilled and filtered to remove colorless crystals which were washed with water and ether and air-dried. The yield of 6-methylamino-9-(3-amino-3-deoxy-β-D - ribofuranosyl)-purine as colorless crystals, M. P. 228–231° C. was 1.016 g. The combined filtrate and washings were evaporated under reduced pressure and the residue evaporated several times under reduced pressure with aqueous ethanol. A solution of the residual amber gum in 50% methanol was stirred with Amberlite IRA-400 (OH) resin for one-half hour. The resin was removed by filtration and the filtrate was evaporated to dryness under reduced pressure. The residue was crystallized from absolute ethanol to yield 1.109 g. of 6-methylamino-9-(3-amino-3-deoxy-β-D-ribofuranosyl)purine as colorless crystals, M. P. 224–230° C. Concentration of the mother liquor afforded an additional 0.226 g. of product, M. P. 195–212° C. giving a total yield of 2.351 g. (84%). When recrystallized from aqueous ethanol colorless crystals were obtained, M. P. 228.5–230.5° C.;

$[\alpha]_D^{24}$ −29.6° (water); $\lambda_{max.}^{0.1\,N\,HCl}$ 262.5 m$\mu$ ($\epsilon$17,600); $\lambda_{max.}^{ethanol}$ 267.5 m$\mu$ ($\epsilon$16,000); $\lambda_{max.}^{0.1\,N\,NaOH}$ 267.5 m$\mu$ ($\epsilon$16,600)

EXAMPLE 28

*6-isobutylamino-9-(3-amino-3-deoxy-β-D-ribofuranosyl)purine*

A mixture of 4.29 g. of 6-chloro-9-(2,5-di-O-benzoyl-3-phthalimido-3-deoxy-β - D - ribofuranosyl)purine (containing one-fourth mole of ethyl acetate and prepared as in Example 22), 7.00 ml. of isobutylamine and 60 ml of anhydrous methanol was heated in a sealed tube on a steam-bath for 6 hours. The resulting amber solution was evaporated to dryness under reduced pressure and the residue evaporated several times under reduced pressure with aqueous ethanol. The residue was treated with 20 ml. of 1:1 ethanol:water and filtered. The filtrate was stirred for 1 hour with 10 g. of Amberlite IRA-400 (OH) resin and then evaporated to dryness under reduced pressure and the crystalline residue evaporated several times under reduced pressure with absolute ethanol to yield 2.889 g. of tan crystalline residue. The residue was washed well with water and the water wash was evaporated to dryness under reduced pressure to a crystalline residue which was recrystallized from absolute ethanol to yield 0.953 g. of 6-isobutylamino-9-(3-amino-3-deoxy-β-D - ribofuranosyl)purine as colorless small plates, M. P. 172–173.2° C. The mother liquor yielded a further crop of crystals, giving a total of 1.200 g. (56%). Recrystallization from absolute ethanol produced colorless crystals, M. P. 171.5–172.5° C.

$[\alpha]_D^{24}$ −25.3° (water); $\lambda_{max.}^{0.1\,N\,HCl}$ 263.5 m$\mu$ ($\epsilon$19,000); $\lambda_{max.}^{EtOH}$ 268 m$\mu$ ($\epsilon$17,700); $\lambda_{max.}^{0.1\,N\,NaOH}$ 217 m$\mu$ ($\epsilon$11,000), 268.5 m$\mu$ ($\epsilon$18,000)

EXAMPLE 29

*6-dimethylamino-9-(3-amino-3-deoxy-β-D-ribofuranosyl)purine*

A mixture of 0.969 g. of 6-chloro-9-(2,5-di-O-benzoyl-3-phthalimido-3-deoxy-β-D - ribofuranosyl)purine (containing one-half mole of ethyl acetate and prepared as in Example 22), 1.0 ml. of dimethylamine and 5 ml. of anhydrous methanol in a sealed tube was heated on a steam-bath for 6 hours. The tube was cooled and opened and 2.1 ml. of an anhydrous methanol solution of 0.24 g. of methylamine was added. The tube was resealed and heated on a steam-bath for 6 hours. Chilling produced nearly colorless crystals which were collected by centrifugation, washed with methanol, and dried under reduced pressure. The product, 0.368 g., M. P. 205–207° C., was recrystallized from absolute ethanol to give 0.258 g. of colorless crystals of 6-dimethylamino-9-(3-amino-3-deoxy-β-D-ribofuranosyl)purine, M. P. 214–216° C.

EXAMPLE 30

*6-(1-piperidyl)-9-(3[o-(1-piperidylcarbonyl)benzamido]-3-deoxy-β-D-ribofuranosyl)purine*

A mixture of 6.68 g. of 6-chloro-9-(2,5-di-O-benzoyl-3-phthalimido-3-deoxy-β - D - ribofuranosyl)purine (containing one-fourth mole of ethyl acetate and prepared as in Example 22), 12.9 ml. of piperidine and 50 ml. of anhydrous methanol in a sealed tube was heated on a steam-bath for 6 hours. The resulting amber solution was evaporated under reduced pressure and the residual crystals and gum were evaporated under reduced pressure several times with aqueous ethanol, and finally with absolute ethanol. A solution in 100 ml. of 60% ethanol of the residue was stirred for 2 hours with 20 g. of Amberlite IRC–400 (OH) resin and the filtrate was evaporated to dryness under reduced pressure to yield a tan glass. The glass was triturated with ether and dried at 70° C. (0.01 mm.) to yield 3.609 g. (61%) of crude 6 - (1 - piperidyl) - 9 - (3 - [o - 1 - piperidylcarbonyl)-benzamido]-3-deoxy-β-D-ribofuranosyl)purine;

$\lambda_{max.}^{0.1\,N\,HCl}$ 272.5 m$\mu$ ($\epsilon$18,400); $\lambda_{max.}^{EtOH}$ 279 m$\mu$ ($\epsilon$19,100); $\lambda_{max.}^{0.1\,N\,NaOH}$ 280 m$\mu$ ($\epsilon$19,200)

EXAMPLE 31

*6-(1-Piperidyl)-9-(3-amino-3-deoxy-β-D-ribofuranosyl)purine*

A solution of 3.556 g. of 6-(1-piperidyl)9-(3-[o-(1-piperidylcarbonyl)benzamido] - 3 - deoxy - β - D - ribofuranosyl)purine (prepared as in Example 30) and 1.026 g. of methylamine in 39 ml. of anhydrous methanol in a sealed tube was heated on a steam-bath for 6 hours. The cooled reaction mixture was filtered, removing 1.077 g. of 6 - (1 - piperidyl) - 9 - (3 - amino - 3 - deoxy - β-D-ribofuranosyl)purine as colorless shiny small prisms, M. P. 189–191° C. Concentration of the mother liquor yielded an additional 0.244 g. of product, M. P. 188–191° C., giving a total yield of 61%.

Recrystallization from methanol yielded colorless crystals, M. P. 189.5–190° C., of the hemihydrate, $[\alpha]_D^{24}$ −44.0° (ethanol);

$\lambda_{max.}^{0.1\,N\,HCl}$ 272.5 m$\mu$ ($\epsilon$21,400); $\lambda_{max.}^{EtOH}$ 217.5 m$\mu$ ($\epsilon$16,400), m$\mu$ ($\epsilon$22,500); $\lambda_{max.}^{0.1\,N\,NaOH}$ 216.5 m$\mu$ ($\epsilon$25,200), 281 m$\mu$ ($\epsilon$22,400)

EXAMPLE 32

*6-dipropylamino-9-(3-amino-3-deoxy-β-D-ribofuranosyl)purine*

A mixture of 6.68 g. of 6-chloro-9-(2,5-di-O-benzoyl-3-phthalimido-3-deoxy-β-D-ribofuranosyl)purine (containing one-half mole of ethyl acetate and prepared as in Example 22), 13.8 ml. of dipropylamine and 60 ml. of anhydrous methanol in a sealed tube was heated on a steam-bath for 6 hours. The tube was cooled and opened and 15 ml. of an anhydrous methanol solution of 1.71 g. of methylamine was added. The tube was resealed and heated on a steam-bath for 6 hours. The resulting light tan solution was evaporated to dryness under reduced pressure, and the residue was evaporated to dryness under reduced pressure with aqueous ethanol. The residue was triturated with 300 ml. of 5:1 methanol:water, chilled and filtered. The filtrate was stirred for 1 hour with 15 g. of Amberlite IRA–400 (OH) resin and then evaporated to dryness under reduced pressure. The residue was triturated with methanol, chilled, filtered and washed with ethyl acetate to yield 1.093 g. of 6-dipropyl-amino-9-(3-amino-3-deoxy-β-D - ribofuranosyl)purine as colorless shiny plates, M. P. 168–169.5° C. Recrystallization from ethyl acetate yielded lustrous colorless plates, M. P. 168.5–169.5° C.; $[\alpha]_D^{24}$ −45.0° (methanol);

$\lambda_{max.}^{0.1\,N\,HCl}$ 270 m$\mu$ ($\epsilon$20,000); $\lambda_{max.}^{MeOH}$ 215 m$\mu$ ($\epsilon$15,600), 277.5 m$\mu$ ($\epsilon$20,400); $\lambda_{max.}^{0.1\,N\,NaOH}$ 217.5 m$\mu$ ($\epsilon$27,600), 280 m$\mu$ ($\epsilon$20,500)

EXAMPLE 33

*Bis(2,6-dichloropurinyl)mercury*

To a solution of 37.7 ml. of 1 N sodium hydroxide and 100 ml. of water at 75° C., 7.14 g. of 2,6-dichloropurine was added rapidly with stirring. Then a hot solution of 10.24 g. of mercuric chloride in 30 ml. of ethanol was immediately added and the slurry rapidly chilled. The tan crystals were removed by filtration, washed with water and dried at 100° C. The yield of bis(2,6-dichloropurinyl)mercury was 11.41 g.

EXAMPLE 34

*2,6-dichloro-9-(2,5-di-O-benzoyl-3-phthalimido-3-deoxy-D-ribofuranosyl)purine*

To a stirred, refluxing suspension of 6.50 g. of bis(2,6-dichloropurinyl)mercury (prepared as in Example 33) in 100 ml. of xylene, a hot solution of 9.10 g. of 2,5-di-O-benzoyl-3-phthalimido-3-deoxy - β - D-ribofuranosyl chloride in 90 ml. of anhydrous xylene was added. The mixture was refluxed for 5 hours and filtered while hot. The small amount of precipitate was washed with hot chloroform and the combined filtrate and washings were cooled and washed with 30% potassium iodide and with water and dried over anhydrous magnesium sulfate. Evaporation under reduced pressure yielded 12.0 g. of 2,6-dichloro-9-(2,5-di-O-benzoyl-3-phthalimido-3-deoxy-D-ribofuranosyl)-purine as a nearly colorless glass.

Crystallizaiton from ethyl acetate-hexane yield 6.51 g. (55%) of 2,6-dichloro-9-(2,5-di-O-benzoyl-3-phthalimido-3-deoxy-D-ribofuranosyl)purine as colorless crystals, which sintered at 58–60° C. to an opaque glass and melted at 95–105° C. to a clear glass; $[\alpha]_D^{28}$ −57.0° (chloroform);

$\lambda_{max.}^{0.1\,N\,HCl}$ 276 m$\mu$ ($\epsilon$11,400); $\lambda_{max.}^{methanol}$ 275 m$\mu$ ($\epsilon$11,400); $\lambda_{infl.}^{0.1\,N\,NaOH}$ 260 m$\mu$ ($\epsilon$9,360), 267.5 m$\mu$ ($\epsilon$8,910)

EXAMPLE 35

*6-methylamino-9-(3-acetamido-3-deoxy-α and β-D-ribofuranosyl)purine*

A mixture of 5.708 g. of 6-chloro-9-(2,5-di-O-benzoyl-3-acetamido-3-deoxy-D-ribofuranosyl)purine (prepared as in Example 23), 3.35 g. of methylamine and 44 ml. of anhydrous methanol in a sealed tube was heated on a steam-bath for 2 hours. The dark red-brown solution was evaporated under reduced pressure and the residue was twice evaporated to dryness with water under reduced pressure. A solution of the residue in 100 ml. of 1:1 methanol:water was stirred for 1 hour with 15 g. of Amberlite IRA–400 (OH) resin and the filtered solution was evaporated to dryness under reduced pressure. The residue was evaporated to dryness several times with absolute ethanol under reduced pressure. The residue, 4.71 g., was crystallized from methanol to yield in two crops 0.869 g. of nearly colorless crystals, M. P. 210–219° C. Recrystallization from methanol yielded 0.145 g. of 6 - methylamino - 9 - (3 - acetamido - 3 - deoxy - α - D-ribofuranosyl)purine as colorless crystals, M. P. 250–255° C. (dec.). The combined methanol filtrates were evaporated to dryness under reduced pressure to yield a gummy residue which was partitioned on 120 g. of Celite in the system 5:1:1 chloroform:methanol:water; the column was eluted with the lower phase and thirty-four 10 ml. portions of eluate were collected. The column was then eluted with the lower phase of the system 5:2:1 chloroform:methanol:water, thirty-eight 10 ml. portions of eluate being collected; the column was finally eluted with methanol, a 176 ml. and twenty-two 10 ml. portions of eluate being collected. Combined eluates 34–64 were evaporated to dryness under reduced pressure to give 0.886 g. (26%) of tan crystals of 6-methylamino-9-(3-acetamido-3-deoxy-β-D-ribofuranosyl)purine. When recrystallized several times from methanol, colorless crystals (containing one-fourth mole of water) were obtained, M. P. 229–230° C. (dec.); $[\alpha]_D^{28}$ −2.0° (water);

$\lambda_{max}^{0.1\,N\,HCl}$ 262.5 mµ ($\epsilon$18,000); $\lambda_{max}^{water}$ 265 mµ ($\epsilon$16,700); $\lambda_{max}^{0.1\,N\,NaOH}$ 266 mµ ($\epsilon$17,000)

Combined eluates 73 and 74 were evaporated to dryness under reduced pressure to yield 0.367 g. of 6-methyl-amino - 9 - (3 - acetamido - 3 - deoxy - α - D - ribofuran-osyl)purine, giving a total of 0.512 g. (15%). Several recrystallizations from methanol yielded colorless needles (containing one-fourth mole of water), M. P. 257–258° C. (dec.); $[\alpha]_D^{28}$ +114.0° (water);

$\lambda_{max}^{0.1\,N\,HCl}$ 262.5 mµ ($\epsilon$18,400); $\lambda_{max}^{water}$ 264 mµ ($\epsilon$17,900); $\lambda_{max}^{0.1\,N\,NaOH}$ 265 mµ ($\epsilon$17,300)

EXAMPLE 36

*6-methylamino-9-(3-amino-3-deoxy-β-D-ribofuranosyl)purine*

A solution of 8.11 g. of 82.3% 6-methylamino-9-(3-acetamido-3-deoxy-D-ribofuranosyl)purine (prepared as in Example 35) in 150 ml. of saturated aqueous barium hydroxide was heated on a steam-bath for 1 hour. Excess carbon dioxide was added and the precipitated barium carbonate was removed by filtration. The filtrate was evaporated to dryness under reduced pressure and the residue was dissolved in 200 ml. of absolute ethanol, filtered to remove a precipitate, and evaporated to dryness under reduced pressure to yield a residual brown glass.

*Column I.*—A solution of the glassy residue in 30 ml. of 1:1 methanol:water was percolated through a column of Amberlite IRC–50 (H) resin and the resin column was washed with 800 ml. of 1:1 methanol:water, the final eluate showing negligible absorption at 275 mµ. The column was washed with 600 ml. of 1:1 metha-nol:0.6 N ammonium hydroxide, the final eluate showing negligible absorption at 277 mµ. Evaporation to dryness under reduced pressure of the methanol:0.6 N ammonium hydroxide eluate yielded 0.791 g. of residual crystals and glass.

*Column II.*—The 0.791 g. of residue from column I was partitioned on 26 g. of Celite in the system 20:1:4 ethyl acetate:methanol:water and the column successively washed with 80 ml., 70 ml. and 80 ml. of the upper phases of the systems 20:1:4, 10:1:2 and 20:3:4 ethyl acetate:methanol:water. The column was finally washed with methanol to elute two tan-colored bands. Evaporation of the methanol eluate yielded 0.489 g. of residue.

*Column III.*—The 0.489 g. of residue from column II was partitioned on 22 g. of Celite in the system 5:2:1 chloroform:methanol:water and the column was eluted with lower phase; eighteen 3.6 ml. portions of eluate were collected and evaporated to dryness. Eluates 8–18, containing a total of 0.235 g. of nearly colorless crystals, were combined and recrystallized from absolute ethanol to yield, in two crops, 0.178 g. (3%) of nearly colorless crystals of 6-methylamino-9-(3-amino-3-deoxy-β-D-ribofuranosyl)purine, M. P. 227–229° C. Recrystallization from absolute ethanol, with the aid of Norit, yielded colorless crystals, M. P. 230–231° C.; $[\alpha]_D^{25}$ −26.9° (water);

$\lambda_{max}^{0.1\,N\,HCl}$ 262 mµ ($\epsilon$17,100); $\lambda_{max}^{ethanol}$ 266 mµ ($\epsilon$16,200); $\lambda_{max}^{0.1\,N\,NaOH}$ 266 mµ ($\epsilon$16,300)

The methanol:water eluate of column I was evaporated to dryness under reduced pressure to yield 4.71 g. of a glassy residue which was rehydrolyzed with barium hydroxide as above.

*Column IV.*—The rehydrolysis product was partitioned on 115 g. of Celite in the system 5:2:1 chloroform:methanol:water, using lower phase to elute the column, and forty-five 15 ml. portions of eluate were collected. Combined eluates 20–32 were evaporated to dryness to yield 1.157 g. of crystalline residue which was recrystallized several times from absolute ethanol to yield 0.063 g. (1%) of colorless crystals of 6-methylamino-9-(3-amino-3-deoxy-β-D-ribofuranosyl)purine, M. P. 228–230° C.

*Column V.*—Combined eluates 8–18 of column IV were evaporated to dryness to yield 0.771 g. of residue which was partitioned on 28 g. of Celite in the system 6:4:1 butanol:water:acetic acid and the column was eluted with upper phase; twenty-two 2 ml. portions of eluate were collected. Combined eluates 6–16 were evaporated to dryness to yield 0.528 g. of residue which was crystallized from methanol to yield colorless crystals, M. P. 229–230° C., of recovered 6-methylamino-9-(3-acetamido - 3 - deoxy - β -D - ribofuranosyl)purine hemi-hydrate.

EXAMPLE 37

*6-diethylamino-9-(3-amino-3-deoxy-β-D-ribofuranosyl)purine*

A mixture of 1.000 g. of 6-chloro-9-(2,5-di-O-benzoyl-3 - phthalimido - 3 - deoxy - β - D - ribofuranosyl)purine (containing one-third mole of ethyl acetate), 1.18 ml. of diethylamine and 25 ml. of anhydrous methanol was refluxed for 3 hours. Butylamine, 1 ml., was added and the resulting solution was refluxed for 3 hours. The cooled solution was stirred for 45 minutes with 5 g. of Amberlite IRA–400 (OH) resin and the filtered solution was evaporated to dryness under reduced pressure. The light tan residual solid was crystallized from 3A alcohol to yield colorless crystals of 6-diethylamino-9-(3-amino-3-deoxy-β-D-ribofuranosyl)purine which after washing with ethyl acetate and ether weighed 0.133 g. and had M. P. 179.5–181.5° C. The mother liquor was evaporated to dryness and the residue was washed with ethyl-acetate and ether to yield an additional 0.106 g. of product as colorless crystals, M. P. 179.5–181° C. The combined crops were recrystallized from absolute ethanol and then from ethyl acetate-absolute ethanol to yield colorless crystals, M. P. 181.5–182.5° C.; $[\alpha]_D^{25}$ −44.0° (ethanol);

$\lambda_{max}^{0.1\,N\,HCl}$ 268 mµ ($\epsilon$18,200); $\lambda_{max}^{ethanol}$ 276.5 mµ ($\epsilon$18,800); $\lambda_{max}^{0.1\,N\,NaOH}$ 277 mµ ($\epsilon$19,300)

EXAMPLE 38

6-dibutylamino-9-(3-amino-3-deoxy-β-D-ribofuranosyl)purine

A mixture of 6.50 g. of 6-chloro-9-(2,5-di-O-benzoyl-3 - phthalimido - 3 - deoxy - β - D - ribofuranosyl)purine (containing one-third mole of ethyl acetate), 9.7 g. of dibutylamine and 50 ml. of anhydrous methanol in a sealed tube was heated on a steam-bath for 1¾ hours. The cooled tube was opened, 5 ml. of butylamine was added, and the tube was resealed and heated on a steam-bath for 1¾ hours. The resulting amber solution was evaporated to dryness under reduced pressure and the crystalline residue was twice evaporated to dryness under reduced pressure with absolute ethanol. Recrystallization of the residue from absolute ethanol gave 1.144 g. of 6-dibutylamino - 9 - (3 - amino - 3 - deoxy - β - D - ribofuranosyl)purine as colorless small plates, M. P. 189.5–190.5° C. The mother liquor was concentrated to a volume of 100 ml., diluted with 20 ml. of water, and the resulting solution stirred for 45 minutes with 25 g. of Amberlite IRA–400 (OH) resin. The filtered solution was evaporated under reduced pressure to a crystalline residue which was slurried with absolute ethanol and evaporated to dryness under reduced pressure. Recrystallization from absolute ethanol gave, in four crops, 1.067 g. of product as colorless small plates, M. P. 184.5–190° C. The combined crops were recrystallized from 3A alcohol to yield colorless crystals, M. P. 189.5–190.5° C.; $[\alpha]_D^{26}$ —38.8° (methanol);

$\lambda_{max.}^{0.1\,N\,HCl}$ 271 m$\mu$ ($\epsilon$19,200); $\lambda_{max.}^{methanol}$ 279 m$\mu$ ($\epsilon$19,400); $\lambda_{max.}^{0.1\,N\,NaOH}$ 280 m$\mu$ ($\epsilon$19,600)

EXAMPLE 39

6-furfurylamino-9-(3-amino-3-deoxy-β-D-ribofuranosyl)purine

A solution of 5.73 g. of 6-chloro-9-(2,5-di-O-benzoyl-3 - phthalimido - 3 - deoxy - β - D - ribofuranosyl)purine (containing one-half mole of ethyl acetate), 8.3 ml. of furfurylamine and 25 ml. of methyl Cellosolve was refluxed for 1 hour. The resulting amber solution was evaporated under reduced pressure to a brown gum, a solution of which in 9.9 ml. of butylamine and 25 ml. of anhydrous methanol was refluxed for 4¼ hours. The resulting brown solution was evaporated to residue under reduced pressure. A solution of the residue in 80 ml. of 80% ethanol was stirred for 1 hour with 20 g. of Amberlite IRA–400 (OH) resin. The filtered solution was evaporated to dryness under reduced pressure and the residual gum was evaporated under reduced pressure several times with absolute ethanol. The residue, consisting of brown crystals and gum, was crystallized from absolute ethanol to yield 0.814 g. of 6-furfurylamino-9-(3-amino-3-deoxy-β-D-ribofuranosyl)purine as nearly colorless crystals, M. P. 153° C. (gas). Recrystallization from 3A alcohol and then from ethyl acetate-absolute ethanol gave colorless crystals, M. P. 157.5–158.5° C.; $[\alpha]_D^{26}$ —43.5° (water);

$\lambda_{max.}^{0.1\,N\,HCl}$ 264 m$\mu$ ($\epsilon$17,900); $\lambda_{max.}^{methanol}$ 267.5 m$\mu$ ($\epsilon$18,400); $\lambda_{max.}^{0.1\,N\,NaOH}$ 268 m$\mu$ ($\epsilon$19,200)

EXAMPLE 40

6-benzylamino-9-(3-amino-3-deoxy-β-D-ribofuranosyl)purine

A mixture of 6.68 g. of 6-chloro-9-(2,5-di-O-benzoyl-3 - phthalimido - 3 - deoxy - β - D - ribofuranosyl)purine (containing one-half mole of ethyl acetate), 10.9 ml. of benzylamine and 65 ml. of anhydrous methanol in a sealed tube was heated on a steam-bath for 2 hours. The resulting solution was evaporated under reduced pressure to a residual gum, a solution of which in 240 ml. of methanol and 60 ml. of water was stirred for 1 hour with 20 g. of Amberlite IRA–400 (OH) resin. The filtered solution was evaporated under reduced pressure to a crystalline residue which was treated with absolute ethanol and filtered. The filtrate was evaporated under reduced pressure to a syrup which was crystallized from ethyl acetate-ether to yield 2.695 g. of nearly colorless crystals, M. P. 150–165° C. Several recrystallizations from absolute ethanol gave 6-benzylamino-9-(3-amino-3-deoxy-β-D-ribofuranosyl)purine as colorless crystals, M. P. 174.5–175.5° C.; $[\alpha]_D^{25}$ —41.8° (methanol);

$\lambda_{max.}^{0.1\,N\,HCl}$ 264 m$\mu$ ($\epsilon$20,800); $\lambda_{max.}^{methanol}$ 270 m$\mu$ ($\epsilon$20,600); $\lambda_{max.}^{0.1\,N\,NaOH}$ 270 m$\mu$ ($\epsilon$21,200)

EXAMPLE 41

6-methoxy-9-(3-phthalimido-3-deoxy-β-D-ribofuranosyl)purine

A solution of 2.00 g. of 6-chloro-9-(2,5-di-O-benzoyl-3 - phthalimido-3-deoxy-β-D-ribofuranosyl)purine (containing one-third mole of ethyl acetate), 5 ml. of chloroform, 7.25 ml. of anhydrous methanol and 9.24 ml. of 1 N methanolic sodium methoxide was refluxed for 2 hours. The reaction mixture was then evaporated to dryness under reduced pressure. A suspension of the residue in 20 ml. of dimethylformamide and 0.438 ml. of glacial acetic acid was refluxed for 1 hour, cooled and filtered, and the filtrate was evaporated to dryness under reduced pressure. The residual tan crystals were washed with ethyl acetate and water to yield 0.749 g. of 6-methoxy-9-(3-phthalimido-3-deoxy-β-D-ribofuranosyl)purine as tan crystals, M. P. 229–231° C. (dec.). Repeated recrystallization from aqueous ethanol (with the aid of activated charcoal) gave colorless crystals, M. P. 243–244° (dec.); $[\alpha]_D^{26}$ —113.0° (methanol);

$\lambda_{max.}^{0.1\,N\,HCl}$ 222.5 m$\mu$ ($\epsilon$37,900), 242.5 m$\mu$ ($\epsilon$18,600); $\lambda_{max.}^{methanol}$ 220 m$\mu$ ($\epsilon$35,100), 242.5 m$\mu$ ($\epsilon$18,100); $\lambda_{max.}^{0.1\,N\,NaOH}$ 217.5 m$\mu$ ($\epsilon$25,200), 247.5 m$\mu$ ($\epsilon$15,500)

EXAMPLE 42

6-diamylamino-9-(3-amino-3-deoxy-β-D-ribofuranosyl)purine

A mixture of 6.504 g. of 6-chloro-9-(2,5-di-O-benzoyl-3 - phthalimido-3-deoxy-β-D-ribofuranosyl)purine (containing one-third mole of ethyl acetate), 11.8 g. of diamylamine and 50 ml. of anhydrous methanol in a sealed tube was heated on a steam-bath for 1¾ hours. The cooled tube was opened, 5 ml. of butylamine was added, and the tube was resealed and heated on a steam-bath for 2 hours. The resulting solution was evaporated to dryness under reduced pressure and the residue evaporated to dryness under reduced pressure twice with aqueous ethanol and once with absolute ethanol. Recrystallization of the residue from absolute ethanol gave 1.683 g. of 6 - diamylamino - 9-(3-amino-3-deoxy-β-D-ribofuranosyl)purine as colorless crystals, M. P. 171–172.5° C. The mother liquor was diluted with ethanol to 100 ml., 20 ml. of water was added, and the resulting solution was stirred for 1 hour with 20 g. of Amberlite IRA–400 (OH) resin. The filtered solution was evaporated to dryness under reduced pressure and the residue was triturated with ether to yield an additional 0.473 g. of product as colorless crystals, M. P. 164–167° C. The combined crops were recrystallized several times from absolute ethanol to yield colorless crystals, M. P. 172–173.2° C.; $[\alpha]_D^{26}$ —43.7° (ethanol);

$\lambda_{max.}^{0.1\,N\,HCl}$ 271 m$\mu$ ($\epsilon$20,000); $\lambda_{max.}^{methanol}$ 279 m$\mu$ ($\epsilon$20,600); $\lambda_{max.}^{0.1\,N\,NaOH}$ 280 m$\mu$ ($\epsilon$20,400)

EXAMPLE 43

6-diheptylamino-9-(3-amino-3-deoxy-β-D-ribofuranosyl)purine

A mixture of 3.74 g. of 6-chloro-9-(2,5-di-O-benzoyl-3 - phthalimido-3-deoxy-β-D-ribofuranosyl)purine (containing one-half mole of ethyl acetate), 9.00 g. of diheptylamine and 50 ml. of anhydrous methanol in a sealed tube was heated on a steam-bath for 2¼ hours. The cooled tube was opened, 8 ml. of an anhydrous methanol solution of 0.91 g. of methylamine was added, and the tube was sealed and heated on a steam-bath for 2¾ hours. The resulting solution was evaporated to dryness under reduced pressure and the residue was evaporated to dryness under reduced pressure with aqueous ethanol and then with absolute ethanol. A solution of the residue in 100 ml. of methanol and 20 ml. of water was stirred for 1 hour with 25 g. of Amberlite IRA–400 (OH) resin, and the filtered solution was evaporated to residue under reduced pressure. Crystallization of the residue from ethyl acetate gave 0.641 g. of colorless crystals, M. P. 133–136° C. Evaporation under reduced pressure of the mother liquor and trituration of the residue with ether gave an additional 0.947 g. of product. The combined crops were recrystallized several times from absolute ethanol to give 6-diheptylamino-9-(3-amino-3-deoxy-β-D-ribofuranosyl)purine as colorless crystals, M. P. 137–138°; $[\alpha]_D^{25}$ —36.9° (ethanol);

$\lambda_{max.}^{0.1\ N\ HCl}$ 271 m$\mu$ ($\epsilon$19,700); $\lambda_{max.}^{ethanol}$ 278 m$\mu$ ($\epsilon$20,000); $\lambda_{max.}^{0.1\ N\ NaOH}$ 276 m$\mu$ ($\epsilon$16,200)

EXAMPLE 44

*6-mercapto-9-(2,5-di-O-benzoyl-3-phthalimido-3-deoxy-β-D-ribofuranosyl)purine*

A mixture of 1.000 g. of 6-chloro-9-(2,5-di-O-benzoyl-3 - phthalimido - 3-deoxy-β-D-ribofuranosyl)purine (containing one-third mole of ethyl acetate), 0.129 g. of thiourea and 25 ml. of absolute ethanol was heated to boiling to give a colorless solution. On cooling a yellow precipitate was deposited which was gradually replaced by nearly colorless crystals. After one week at room temperature the product was removed by filtration, washed with absolute ethanol and ether, and dried at 100° C. The yield of 6 - mercapto - 9-(2,5-di-O-benzoyl-3-phthalimido-3-deoxy-β-D-ribofuranosyl)purine as nearly colorless crystals, M. P. 233–238° C. (the melting point dependent on the rate of heating), was 0.187 g.; $[\alpha]_D^{26}$ —105.0° (pyridine);

$\lambda_{max.}^{0.1\ N\ HCl}$ 222 m$\mu$ ($\epsilon$68,800), 322.5 m$\mu$ ($\epsilon$25,400); $\lambda_{max.}^{methanol}$ 220 m$\mu$ ($\epsilon$67,200), 321 m$\mu$ ($\epsilon$21,400); $\lambda_{max.}^{0.1\ N\ NaOH}$ 217.5 m$\mu$ ($\epsilon$54,900), 312 m$\mu$ ($\epsilon$22,600)

EXAMPLE 45

*2-chloro-6-dipropylamino-9-(3-amino-3-deoxy-D-ribofuranosyl)purine*

A mixture of 5.93 g. of 2,6-dichloro-9-(2,5-di-O-benzoyl-3-phthalimido-3-deoxy-D-ribofuranosyl)purine, 12.4 ml. of dipropylamine and 50 ml. of anhydrous methanol in a sealed tube was heated on a steam-bath for 2 hours. The cooled tube was opened, 4.5 ml. of butylamine was added, and the tube was sealed and heated on a steam-bath for 2 hours. The resulting solution was evaporated to dryness under reduced pressure and the residue was evaporated to dryness under reduced pressure with aqueous ethanol and then absolute ethanol. A solution of the gummy residue in 100 ml. of 3:1 methanol:water was stirred for 1 hour with 25 g. of Amberlite IRA—400 (OH) resin, and the resin was removed by filtration and washed well with hot methanol. The combined filtrate and washings were evaporated to dryness under reduced pressure, and the residue was evaporated to dryness under reduced pressure several times with absolute ethanol. Crystallization of the glass from 2:1 methanol:water gave 1.840 g. of colorless crystals, M. P. 93–103° C. Recrystallization from ethyl acetate gave 0.061 g. of 2-chloro-6-dipropylamino-9-(3-amino-3-deoxy-D-ribofuranosyl)purine as colorless crystals, M. P. 161–164° C. Further chilling of the aqueous methanolic mother liquor gave, in two crops, 1.562 g. of crude product, M. P. 138–158° C. Several recrystallizations from ethyl acetate gave pure product as lustrous colorless plates, M. P. 164.5–165.5° C.; $[\alpha]_D^{25}$ —23.6° (ethanol);

$\lambda_{max.}^{0.1\ N\ HCl}$ 219 m$\mu$ ($\epsilon$18,900), 283 m$\mu$ ($\epsilon$20,400); $\lambda_{max.}^{methanol}$ 219 m$\mu$ ($\epsilon$20,300), 281 m$\mu$ ($\epsilon$21,600); $\lambda_{max.}^{0.1\ N\ NaOH}$ 217.5 m$\mu$ ($\epsilon$30,400), 282.5 m$\mu$ ($\epsilon$21,000)

EXAMPLE 46

*6-methylmercapto-chloromercuripurine*

A hot solution of 6.502 g. of mercuric chloride in 25 ml. of ethanol was added to a hot solution of 3.979 g. of 6-methylmercaptopurine in 100 ml. of water and 23.94 ml. of 1 N sodium hydroxide to produce a colorless precipitate. To the hot suspension 12.00 g. of diatomaceous earth was added, the suspension was chilled and filtered, and the precipitate was washed with water and dried at 100° C. The precipitate, 21.69 g., contained 9.69 g. of 6-methylmercapto-chloromercuripurine.

EXAMPLE 47

*6-methylmercapto-9-(2,5-di-O-benzoyl-3-phthalimido-3-deoxy-D-ribofuranosyl)purine*

To a stirred, refluxing suspension of 4.34 g. of 6-methylmercapto-chloromercuripurine and 5.38 g. of diatomaceous earth in 165 ml. of xylene, freed from traces of water by refluxing into a moisture point receiver, a hot solution of 5.06 g. of 2,5-di-O-benzoyl-3-phthalimido-3-deoxy-β-D-ribofuranosyl chloride in 50 ml. of xylene was added. The resulting colorless suspension was stirred and refluxed for 6 hours, filtered while hot, and the precipitate was washed with hot chloroform. The combined filtrate and wash were washed with two 25-ml. portions of 30% potassium iodide and two 50-ml. portions of water. The organic solution was evaporated under reduced pressure at 70° C. to yield 6.580 g. of crude 6-methylmercapto 9 (2,5 - di - O - benzoyl - 3 - phthalimido - 3 - deoxy-D - ribofuranosyl)purine as a nearly colorless glass. Crystallization from absolute ethanol-chloroform gave 4.76 g. of colorless crystals, M. P. 193–196° C. Several recrystallizations from absolute ethanol-chloroform gave colorless crystals, M. P. 195.5–196.5° C. (partially melts at 157–159° C. and resolidifies; $[\alpha]_D^{25}$ —88.4° (chloroform);

$\lambda_{max.}^{0.1\ N\ HCl}$ 222 m$\mu$ ($\epsilon$79,600), 285 m$\mu$ ($\epsilon$24,000), 291 m$\mu$ ($\epsilon$23,400); $\lambda_{max.}^{ethanol}$ 220 m$\mu$ ($\epsilon$64,600), 283 m$\mu$ ($\epsilon$23,800), 290 m$\mu$ ($\epsilon$22,200); $\lambda_{max.}^{0.1\ N\ NaOH}$ 217 m$\mu$ ($\epsilon$64,600), 287.5 m$\mu$ ($\epsilon$17,800), 294 m$\mu$ ($\epsilon$17,700)

EXAMPLE 48

*9 - (2,5-di-O-benzoyl-3-phthalimido-3-deoxy-D-ribofuranosyl)purine*

A solution of 1.000 g. of 6-methylmercapto-9-(2,5-di-O-benzoyl - 3-phthalimido-3-deoxy-D-ribofuranosyl)purine in 100 ml. of methyl Cellosolve was stirred with 3 tspns. of Raney nickel while heating on a steam-bath for 45 minutes. While hot, the suspension was filtered through diatomaceous earth and the precipitate was washed well with hot methyl Cellosolve. The combined filtrate and wash were evaporated under reduced pressure to yield 0.458 g. of a pale yellow glass. Crystallization from ethyl acetate-heptane gave 0.210 g. of 9-(2,5-di-O-benzoyl - 3-phthalimido-3-deoxy-D-ribofuranosyl)purine, M. P. 115–119° C. Recrystallization from ethyl acetate-hexane and then from 3A alcohol gave the hydrate as colorless crystals, M. P. 117.5–122° C.; $[\alpha]_D^{25}$ —61.7° (chloroform);

$\lambda_{max.}^{0.1\ N\ HCl}$ 223.5 m$\mu$ ($\epsilon$64,100), 306 m$\mu$, broad ($\epsilon$3,180); $\lambda_{infl.}^{0.1\ N\ HCl}$ 265 m$\mu$ ($\epsilon$8,800); $\lambda_{max.}^{ethanol}$ 221.5 m$\mu$ ($\epsilon$66,500), 262.5 m$\mu$ ($\epsilon$9,500); 300 m$\mu$ broad ($\epsilon$2,280); $\lambda_{infl.}^{ethanol}$ 282.5 m$\mu$ ($\epsilon$3,940); $\lambda_{max.}^{0.1\ N\ NaOH}$ 262.5 m$\mu$ ($\epsilon$9,500)

EXAMPLE 49

6 - decylamino - 9-(3-amino-3-deoxy-β-D-ribofuranosyl) purine

A mixture of 2.00 g. of 6-chloro-9-(2,5-di-O-benzoyl-3 - phthalimido-3-deoxy-β-D-ribofuranosyl)purine (containing one-third mole of ethyl acetate), 3.63 g. of decylamine and 50 ml. of anhydrous methanol was refluxed for 3½ hours. The resulting solution was cooled to room temperature, diluted with 10 ml. of water and stirred with 10 g. of Amberlite IRA-400 (OH) resin for 1 hour (additional methanol was added to prevent the product from crystallizing). The filtered solution was evaporated under reduced pressure and the residue was distilled several times with water under reduced pressure. The viscous residue was treated with methanol and filtered. The filtrate was evaporated to dryness under reduced pressure and the residue was refluxed with ether and filtered to yield 0.383 g. of 6-decylamino-9- (3-amino-3-deoxy-β-D-ribofuranosyl)purine as colorless crystals, M. P. 137–141° C. Several recrystallizations from absolute ethanol (with the aid of activated charcoal) gave colorless crystals, M. P. 138–139° C.; $[\alpha]_D^{25}$ —40.0° (ethanol);

$\lambda_{max.}^{0.1\ N\ NHCl}$ 263 m$\mu$ ($\epsilon$19,800); $\lambda_{max.}^{ethanol}$ 268 m$\mu$ ($\epsilon$18,000); $\lambda_{max.}^{0.1\ N\ NaOH}$ 268.5 m$\mu$ ($\epsilon$17,000)

EXAMPLE 50

6-diallylamino-9-(3-amino-3-deoxy-β-D-ribofuranosyl)purine

A mixture of 6.50 g. of 6-chloro-9-(2,5-di-O-benzoyl-3 - phthalimido - 3-deoxy-β-D-ribofuranosyl)purine (containing one-third mole of ethyl acetate), 7.3 g. of diallylamine and 50 ml. of anhydrous methanol in a sealed tube was heated on a steam-bath for 3¼ hours. The cooled tube was opened, 5 ml. of butylamine was added, and the tube was resealed and heated on a steam-bath for 2 hours. The resulting solution was evaporated under reduced pressure to a brown syrup which was evaporated several times under reduced pressure with aqueous ethanol. A solution of the residual brown syrup in 75 ml. of ethanol and 25 ml. of water was stirred for 1 hour with 20 g. of Amberlite IRA-400 (OH) resin. The filtered solution was evaporated under reduced pressure. The residual crystals and gum were triturated with ether and then diluted with ethyl acetate. Filtration gave 1.114 g. of 6-diallylamino-9-(3-amino-3-deoxy-β-D-ribofuranosyl)purine as colorless crystals, M. P. 158–161° C. The mother liquor deposited an additional 0.217 g. of product, M. P. 154–159° C. Recrystallization from ethyl acetate and ethanol-ethyl acetate gave colorless crystals, M. P. 161–163.5° C.; $[\alpha]_D^{25}$ —43.1° (methanol);

$\lambda_{max.}^{0.1\ N\ HCl}$ 269 m$\mu$ ($\epsilon$19,400); $\lambda_{max.}^{methanol}$ 276 m$\mu$ ($\epsilon$21,800); $\lambda_{max.}^{0.1\ N\ NaOH}$ 277 m$\mu$ ($\epsilon$21,300)

EXAMPLE 51

6-(4-morpholinyl)-9-(3-[o-(4-morpholinylcarbonyl)benzamido]-3-deoxy-β-D-ribofuranosyl)purine A mixture of 6.68 g. of 6-chloro-9-(2,5-di-O-benzoyl-3 - phthalimido - 3 - deoxy - β - D - ribofuranosyl)purine (containing one-half mole of ethyl acetate), 11.3 ml. of morpholine and 50 ml. of anhydrous methanol in a sealed tube was heated on a steam-bath for 6 hours. The resulting brown solution was evaporated under reduced pressure to a residual glass which was twice dissolved in aqueous ethanol and evaporated to dryness under reduced pressure. A solution of the residue in 75 ml. of 2:1 methanol:water was stirred for 1 hour with 15 g. of Amberlite IRA-400 (OH) resin, filtered, and stirred for one-half hour with 15 g. of resin. The filtered solution was evaporated to dryness under reduced pressure and the residue was twice evaporated to dryness under reduced pressure to yield 3.53 g. of 6-(4-morpholinyl)-9 - (3 - [o - (4 - morpholinylcarbonyl)benzamido] - 3-deoxy-β-D-ribofuranosyl)purine as a light tan glass; $[\alpha]_D^{24}$—16.6° (ethanol);

$\lambda_{max.}^{0.1\ N\ HCl}$ 277 m$\mu$ ($\epsilon$15,800); $\lambda_{max.}^{ethanol}$ 278 m$\mu$ ($\epsilon$17,700); $\lambda_{max.}^{0.1\ N\ NaOH}$ 280 m$\mu$ ($\epsilon$18,000)

EXAMPLE 52

6-butylamino-9-(3-amino-3-deoxy-β-D-ribofuranosyl)purine

A mixture of 4.00 g. of 6-chloro-9-(2,5-di-O-benzoyl-3 - phthalimido - 3 - deoxy - β - D - ribofuranosyl)purine (containing one-third mole of ethyl acetate), 4 ml. of butylamine and 100 ml. of anhydrous methanol was refluxed for 3 hours. The resulting solution was diluted with 20 ml. of water and stirred for 1 hour with 20 g. of Amberlite IRA-400 (OH) resin. The filtered solution was evaporated to dryness under reduced pressure. The residual solid was recrystallized from absolute ethanol to yield, after washing with ether, 0.202 g. of 6 - butylamino - 9 - (3 - amino - 3 - deoxy - β - D - ribofuranosyl)purine as colorless crystals, M. P. 171–172° C. Concentration of the mother liquor gave, in three crops, an additional 0.453 g. of product. Recrystallization from absolute ethanol, ethyl acetate and methanol gave the product as colorless crystals containing one-fourth mole of water; $[\alpha]_D^{25}$ —43.7° (ethanol);

$\lambda_{max.}^{0.1\ N\ HCl}$ 262 m$\mu$ ($\epsilon$19,200); $\lambda_{max.}^{ethanol}$ 269 m$\mu$ ($\epsilon$17,300); $\lambda_{max.}^{0.1\ N\ NaOH}$ 269 m$\mu$ ($\epsilon$17,600)

EXAMPLE 53

6-cyclohexylamino-9-(3-amino-3-deoxy-β-D-ribofuranosyl)purine

A mixture of 6.504 g. of 6-chloro-9-(2,5-di-O-benzoyl-3 - phthalimido - 3 - deoxy - β - D - ribofuranosyl)purine (containing one-third mole of ethyl acetate), 11.5 ml. of cyclohexylamine and 50 ml. of anhydrous methanol in a sealed tube was heated on a steam-bath for 2⅓ hours. The resulting solution was evaporated to dryness under reduced pressure and the residue was evaporated to dryness under reduced pressure several times with aqueous ethanol and then with absolute ethanol. A solution of the residual brown glass in 125 ml. of 4:1 methanol:water was stirred for 1 hour with 20 g. of Amberlite IRA-400 (OH) resin. The filtered solution was evaporated to dryness under reduced pressure to yield 5.74 g. of residual tan glass. A mixture of 5.67 g. of the tan glass, 4.5 ml. of butylamine and 50 ml. of anhydrous methanol in a sealed tube was heated on a steam-bath for 2 hours. The resulting amber solution was evaporated to dryness under reduced pressure to a tan semi-solid residue. A solution of the residue in 75 ml. of 3:1 ethanol:water was percolated through a column of 25 g. of Amberlite IRC-50 (H) resin and the column was washed with 938 ml. of 3:1 ethanol:water, the final percolate having a negligible absorption of 269 m$\mu$. The column was then washed with 606 ml. of 3:1 ethanol:2 N ammonium hydroxide, the final percolate having negligible absorption at 269 m$\mu$. The ethanol:2 N ammonium hydroxide percolate was evaporated under reduced pressure to yield 1.880 g. of a nearly colorless glass. The glass was partitioned on 240 g. of diatomaceous earth in the system 6:1:2 ethyl acetate:heptane:water and the column was eluted with upper phase. The eluate was measured spectrophotometrically at 269 m$\mu$ and two peaks were observed. The portions of eluate containing the second absorbing peak were combined and evaporated to dryness under reduced pressure to yield 1.390 g. of 6-cyclohexylamino - 9 - (3 - amino-3-deoxy-β-D-ribofuranosyl)-purine as a colorless glass; $[\alpha]_D^{25}$ —42.5° (ethanol);

$\lambda_{max.}^{0.1\ N\ HCl}$ 263 m$\mu$ ($\epsilon$19,500); $\lambda_{max.}^{ethanol}$ 270 m$\mu$ ($\epsilon$17,300); $\lambda_{max.}^{0.1\ N\ NaOH}$ 270 m$\mu$ ($\epsilon$17,900)

EXAMPLE 54

6-chloro-9-(2,3-di-O-benzoyl-5-phthalimido-5-deoxy-β-D-ribofuranosyl)purine

To a solution of 200 cc. of hydrogen chloride in ether (saturated at 0°) was added 4.83 g. of 1-O-acetyl-2,3-di-O-benzoyl-5-phthalimido-5-deoxy-β-D-ribofuranose and the resulting solution was allowed to stand at −3° C. for three days. It was then evaporated to dryness under reduced pressure at room temperature and the residual gum was dissolved in 20 cc. of anhydrous xylene and was added to a suspension of 3.55 g. of 6-chloropurine mercuric chloride reaction product and 2.12 g. of diatomaceous earth in 300 cc. of anhydrous xylene. The mixture was stirred and refluxed for three hours and was then filtered while still hot. The precipitate was washed with a little chloroform and the washings were added to the original filtrate. This solution was evaporated under reduced pressure and the residue was taken up in a mixture of 20 cc. of a 30% aqueous potassium iodide solution and 120 cc. of chloroform. The layers were separated and the organic phase was washed with another 15 cc. of the potassium iodide solution and then with 20 cc. of water. The chloroform solution was dried and partially decolorized with magnesium sulfate and charcoal and was then filtered. The filtrate was evaporated under reduced pressure and the residue was dried in a desiccator under reduced pressure to afford 5.45 g. of yellow glass. This was dissolved in 20 cc. of benzene and added to the top of a column containing 125 g. of acid washed alumina and benzene (column dimensions 3 x 17 cm.). The column was washed with anhydrous benzene and the washings were discarded. Elution was then carried out with a mixture of 20% ethyl acetate in benzene and a total of ten 100-cc. fractions were collected. These fractions were pooled and evaporated to afford 3.55 g. of 6-chloro-9-(2,3-di-O-benzoyl-5-phthalimido-5-deoxy-β-D-ribofuranosyl)purine as a colorless, fluffed glass. The substance is soluble in chloroform, ethyl acetate and benzene. It is somewhat soluble in ether or ethanol and is insoluble in water.

EXAMPLE 55

6-amino-9-(5-amino-5-deoxy-β-D-ribofuranosyl)purine

A mixture of 1 g. of 6-chloro-9(2,3-di-O-benzoyl-5-phthalimido-5-deoxy-β-D-ribofuranosyl)purine and 30 cc. of methanolic ammonia (saturated at 0° C.) was heated in a stainless steel bomb on a steam-bath for 50 minutes with occasional shaking. The bomb was allowed to cool and was opened and there was added 10 cc. of a solution of 0.067 mole of methylamine in methanol. The bomb was closed and was again heated on the steam-bath for 1 hour. It was allowed to cool and the contents were collected and evaporated under reduced pressure. The residue was mixed with water and with ether. The layers were separated and the water phase was extracted with another portion of ether. The ether fractions were discarded and the dark brown water solution was filtered through a layer of activated charcoal. The filtrate was added to the top of a column containing Amberlite IRC–50 (H) resin. The column was washed with 1 liter of water and the washings were discarded. The column was then washed with 250 cc. of 2 N ammonium hydroxide solution followed by 250 cc. of water. These two fractions were combined and evaporated under reduced pressure at a bath temperature below 45° C. The residue (300 mg.) was dissolved in 2 cc. of the lower phase of a butanol-water mixture and the solution was mixed intimately with 4 g. of diatomaceous earth. This mixture was added to the top of a column of 60 cc. of diatomaceous earth which had been well mixed with 30 cc. of the aqueous phase of the butanol-water mixture. The column was developed with the upper phase of this solvent system and the effluent was checked with a recording ultraviolet spectrophotometer set at 260 mμ. This showed that adenosine-like material started to be washed off the column after 100 cc. of the solvent had run through. Fractions containing this material (about 90 cc.) were pooled and evaporated to yield 200 mg. of amorphous material. This was purified by solution in methanol and filtration through a layer of activated charcoal. The filtrate was concentrated to a small volume and ethyl acetate was added at the boiling point to give 5 cc. of solution. Ether was added until the solution became cloudy and the solid which precipitated out on standing was collected and was washed with more ether. A second portion of solid could be obtained by evaporating the filtrate to a small volume and adding more ether. The combined solids were dried under reduced pressure to afford 0.164 g. of 6-amino-9-(5-amino-5-deoxy-β-D-ribofuranosyl)purine as a white amorphous solid, $$\lambda_{max.}^{ethanol} \ 260 \ m\mu \ (\epsilon 13{,}180)$$

The compound is soluble in ethanol, methanol and water. It is only slightly soluble in ethyl acetate and is insoluble in ether or hexane.

EXAMPLE 56

6-chloro-9-(5-amino-5-deoxy-β-D-ribofuranosyl)purine

To a solution of 1.0 g. of 6-chloro-9-(2,3-di-O-benzoyl-5-phthalimido-5-deoxy-β-D-ribofuranosyl)purine in 6 cc. of hot n-propanol was added 0.6 cc. of hydrazine hydrate and the mixture was heated on a steam-bath for about 5 minutes. The dark suspension was filtered and the precipitate was washed with a little methanol. The filtrate was evaporated under reduced pressure and the residue was taken up in water and the filtered solution was passed into a column of Amberlite IRC–50 (H) resin. The column was washed with 1 liter of water and the washings were discarded. Elution of the column with 2 N ammonium hydroxide (500 cc.) afforded a light red solution which was evaporated under reduced pressure at a bath temperature of 45° C. The dried residue was a pink powder which weighed 0.16 g. This was dissolved in 1.5 cc. of the upper phase and 1.5 cc. of the lower phase of a butanol-water mixture and the solution was mixed with 3 g. of diatomaceous earth. This was packed on the top of a column consisting of 60 g. of diatomaceous earth and 30 cc. of the lower phase of the butanol-water system. The column was washed with the upper phase of this solvent system and the effluent was allowed to pass through a recording ultraviolet spectrophotometer which had been set at 264 mμ. Material showing absorption at this wave length was eluted after 100 cc. of solvent had passed through the column. Fractions containing this material were pooled (95 cc.) and evaporated under reduced pressure at 45° C. The residue (0.07 g.) was taken up in 3 cc. of anhydrous methanol and filtered through charcoal. Dilution of the filtrate with ether brought down a precipitate which was collected and washed with ether by centrifugation to afford 6-chloro-9-(5-amino-5-deoxy-β-D-ribofuranosyl)purine as an amorphous solid. The substance is soluble in ethanol, isopropanol and water and is insoluble in ether and hexane.

EXAMPLE 57

9-(2,3-di-O-benzoyl-5-phthalimido-5-deoxy-β-D-ribofuranosyl)purine

A solution of 0.9 g. of 6-chloro-9-(2,3-di-O-benzoyl-5-phthalimido-5-deoxy-β-D-ribofuranosyl)purine in 15 cc. of methyl Cellosolve was added to 0.12 g. of magnesium oxide and 0.1 g. of 10% palladium on charcoal catalyst. The stirred mixture was reduced with hydrogen under atmospheric pressure. When the hydrogen uptake slowed down, the mixture was filtered and another batch of magnesium oxide and of the palladium catalyst was added. This was repeated once more. When the calculated amount of hydrogen had been taken up, the reduction was stopped and the mixture was filtered. The filtrate was evaporated under reduced pressure and the residue was dissolved in 80 cc. of methylene chloride. This solution was washed with several small portions of water and was then dried over magnesium sulfate, filtered and freed from solvent under reduced pressure. The residue (0.82 g.) was crystallized from a mixture of ether and methylene chloride to afford 0.542 g. of 9-(2,3-di-O-benzoyl-5-phthalimido-5-deoxy-β-D - ribofuranosyl)purine, M. P. 153–155° C. The compound is soluble in methylene chloride, ethyl acetate and ethanol but is insoluble in water or in hexane.

EXAMPLE 58

*9-(5-amino-5-deoxy-β-D-ribofuranosyl)purine*

To a suspension of 1 g. of 9-(2,3-di-O-benzoyl-5-phthalimido-5-deoxy-β-D-ribofuranosyl)purine in 10 cc. of n-propanol was added 0.9 cc. of hydrazine hydrate and the mixture was heated on a steam bath for five minutes. All of the solid went into solution as soon as heat was applied to the flask and another solid precipitated out as the reaction proceeded. After the 5 minute heating period, the mixture was allowed to cool and was filtered. The precipitate was washed with a little methanol and was discarded. The washings and filtrate were combined and evaporated to a volume of about 20 cc. and this solution was added to the top of a column of Amberlite IRC–50 (H) resin. The column was washed with 1 liter of water and the washings were discarded. The column was then washed with 250 cc. of 2 N aqueous ammonium hydroxide and with 150 cc. of water. These fractions were combined and evaporated under reduced pressure. The residue (0.19 g.) was dissolved in 2 cc. of the lower phase and 2 cc. of the upper phase of a butanol-water mixture and the solution was mixed intimately with 4 g. of diatomaceous earth. This was added to a column prepared from 60 g. of diatomaceous earth which had been mixed with 30 cc. of the lower phase of the butanol-water mixture. The dimensions of the completed column were 54 cm. x 2 cm. The column was washed with the upper phase of the solvent system and the effluent was allowed to pass through a recording ultraviolet spectrophotometer which had been set at 260 mµ. After some 100 cc. of solvent had passed through the column, material which absorbed at this wave length started to come off. All fractions containing this substance were collected, pooled and evaporated under reduced pressure to afford 0.1 g. of glass. This was dissolved in methanol passed through a layer of charcoal and the filtrate was once more evaporated. This residue was crystallized from a mixture of ethyl acetate and ether. There was obtained 0.044 g. of 9-(5-amino-5-deoxy-β-D-ribofuranosyl)purine which decomposed slowly between 148–155° C. (depending on the rate of heating);

$\lambda_{max.}^{methanol}$ 263 mµ (ε6,640)

The compound is soluble in ethanol and water. It is somewhat soluble in ethyl acetate and insoluble in ether.

EXAMPLE 59

*2-methylmercapto-6-dimethylamino-9-(2,3-di-O-benzoyl-5-phthalimido-5-deoxy-β-D-ribofuranosyl)purine*

To 25 cc. of a saturated ethereal hydrogen chloride solution was added 0.486 g. of 1-O-acetyl-2,3-di-O-benzoyl-5-phthalimido-5-deoxy-D-ribofuranose and 0.5 cc. of acetyl chloride. The solution was allowed to stand at −3° C. for three days and was then evaporated under reduced pressure to leave 2,3-di-O-benzoyl-5-phthalimido-5-deoxy-D-ribofuranosyl chloride as a gum. This was immediately dissolved in a small volume of xylene and was added to an azeotropically dried suspension of 0.44 g. of 2-methylmercapto-6-dimethylamino mercuric chloride reaction product and 0.25 g. of diatomaceous earth in 40 cc. of xylene. The suspension was stirred at the reflux point for three hours and was then filtered. The filtrate was evaporated under reduced pressure and the residue was dissolved in 50 cc. of chloroform. This solution was washed with two 15 cc. portions of a 30% aqueous potassium iodide solution and then with a little water. The organic solution was dried and partially decolorized over magnesium sulfate and charcoal and was then filtered. The filtrate was evaporated under reduced pressure and the residue was redissolved in a small amount of methylene chloride and decanted from insoluble material. This solution was filtered once more through a layer of charcoal and was evaporated under reduced pressure. This left 2-methylmercapto-6-dimethylamino-9-(2,3-di-O-benzoyl - 5 - phthalimido - 5 - benzoyl-β-D-ribofuranosyl) purine as a viscous gum (0.39 g.). The substance is soluble in chloroform and ethyl acetate and is insoluble in water or hexane.

EXAMPLE 60

*2-methylmercapto-6-dimethylamino-9-(5-amino-5-deoxy-β-D-ribofuranosyl)purine*

A solution of 0.37 g. of 2-methylmercapto-6-dimethylamino-9-(2,3-di-O-benzoyl-5-phthalimido - 5 - deoxy-β-D-ribofuranosyl)purine in 25 cc. of methanol was mixed with 2 cc. of a solution of 0.0134 mole of methylamine in methanol. The mixture was heated in a steel bomb at 100° C. for 3.5 hours and was then cooled to room temperature. The contents of the bomb were filtered through a layer of charcoal and the filtrate was evaporated under reduced pressure. The gummy residue was dissolved in 50% aqueous methanol and the solution was passed into a column of Amberlite IRC–50 (H) resin. The column was washed with 600 cc. of 50% aqueous methanol and the washings were discarded. The column was then washed with a 2 N solution of ammonium hydroxide in 50% aqueous methanol (300 cc.) and the effluent was evaporated under reduced pressure. The residue was dissolved in a mixture of methanol and ethyl acetate and was freed from traces of insoluble material by filtration through charcoal. The filtrate was evaporated under reduced pressure and the residue was dissolved in a small amount of methylene chloride and the solution was diluted with anhydrous ether. This caused the precipitation of 2 - methylmercapto-6-dimethylamino-9-(5-amino-5-deoxy-β-D-ribofuranosyl)purine as an amorphous solid (0.02 g.); $\lambda_{max.}$ 246 mµ and 285 mµ. The compound is soluble in methanol, isopropanol and ethyl acetate. It is insoluble in ether and in hexane.

EXAMPLE 61

*6-dimethylamino-9-(2,3-di-O-benzoyl-5-phthalimido - 5 - deoxy - β - D - ribofuranosyl)purine*

A solution of 2,3-di-O-benzoyl-5-phthalimido-5-deoxy-D-ribofuranosyl chloride (obtained from 5.4 g. of 1-O-acetyl - 2,3 - di - O - benzoyl - 5 - phthalimido - 5-deoxy-D-ribofuranose) in 20 cc. of dry xylene was added to an azeotropically dried suspension of 4.06 g. of 6-dimethylamino mercuric chloride reaction product and 1.52 g. of diatomaceous earth in 200 cc. of xylene. The mixture was stirred at the reflux point for 3 hours and was then filtered while hot. The precipitate was washed with a little chloroform and filtrate and washings were combined and evaporated under reduced pressure. The residue was taken up in a mixture of 150 cc. of chloroform and 30 cc. of a 30% aqueous potassium iodide solution. The layers were separated and the chloroform phase was washed once more with 30 cc. of the potassium iodide solution and then with 20 cc. of water. The chloroform solution was dried over magnesium sulfate, filtered and freed from solvent under reduced pressure. The residue was dissolved in hot ethanol (70 cc.) and the solution was allowed to stand until crystallization was complete. The solid was filtered and washed with a little ethanol. After drying there was obtained 3.84 g. of 6 - dimethylamino - 9 - (2,3 - di - O -benzoyl - 5 - phthalimido-5-deoxy-β-D-ribofuranosyl)purine, M. P. 220° C, with softening above 198° C. Recrystallization from ethanol brought the M. P. to 230–232° C. The compound is soluble in chloroform and is slightly soluble in ethanol. It is insoluble in water, ether or hexane.

EXAMPLE 62

*6-dimethylamino-9-(5-amino-5-deoxy-β-D-ribofuranosyl)purine*

To a suspension of 6-dimethylamino-9-(2,3-di-O-benzoyl - 5 - phthalimido - 5 deoxy - β - D - ribofuranosyl)-purine (0.632 g.) in 6 cc. of n-propanol was added 0.6 cc. of hydrazine hydrate and the mixture was heated on the steam-bath for 4 minutes. The solid dissolved and another solid precipitated out during this time. The cooled solution was filtered and the precipitate was washed with 8 cc. of methanol and was then discarded. The filtrate was evaporated under reduced pressure and the residue was dissolved in 15 cc. of water. The solution was passed into a column of Amberlite IRC–50 (H) resin and the column was washed with 1 l. of water. These washings were discarded. The column was then washed with 250 cc. of a 2 N ammonium hydroxide solution and with 200 cc. of water. These fractions were combined and evaporated under reduced pressure. The residue was dried by evaporation with ethanol and was then dissolved in a little ethanol and the solution was filtered through a layer of charcoal. The filtrate was condensed to a volume of about 1 cc. and anhydrous ether was added until no more material precipitated. The solid was collected by centrifugation and was washed thoroughly with anhydrous ether. This afforded 0.228 g. of amorphous solid. It could be crystallized from a small volume of isopropanol to yield 0.145 g. of 6-dimethylamino-9-(5-amino-5-deoxy-β-D-ribofuranosyl)purine, M. P. 132–133° C.;

$\lambda_{max.}^{0.1\ N\ HCl}$ 267 m$\mu$  $\lambda_{max.}^{water}$ 274 m$\mu$  $\lambda_{max.}^{0.1\ N\ NaOH}$ 275 m$\mu$ The substance is soluble in methanol, propanol and water and is insoluble in ether and hexane.

EXAMPLE 63

*2 - methylmercapto - 6 - dimethylamino-9(2-acetamido-2-deoxy-4,6-O-benzylidene-β-D-glucopyranosyl)purine*

A mixture of 2-methylmercapto-6-dimethylamino-9-(2-acetamido-2-deoxy-β-D-glucopyranosyl)purine (15.7 g.) (Example 6) and freshly fused zinc chloride (28.4 g.) in 142 cc. of benzaldehyde was shaken for 20 hours. The solution was then poured into 2000 cc. of anhydrous ether with stirring. The white solid that separated was collected under anhydrous conditions and washed with anhydrous ether. The partially dried solid was dissolved in 1000 cc. of ethyl Cellosolve and 96.5 cc. of 10% sodium hydroxide was added. After standing at room temperature for 10 minutes, the solution was neutralized by bubbling carbon dioxide through it, then concentrated to a semisolid under reduced pressure. The residue was partially dissolved in 100 cc. of ethyl Cellosolve and 500 cc. of water was added with stirring. The product was washed with two 80 cc. portions of 1:5 ethyl Cellosolve:water. The yield of 2-methylmercapto-6-dimethylamino-9-(2-acetamido-2-deoxy-4,6-O-benzylidene-β-D - glucopyranosyl)purine as tan crystals, M. P. 254–255° C., dec., was 12.6 g.

EXAMPLE 64

*2 - methylmercapto-6-dimethylamino-9-(2-acetamido - 2 - deoxy-3-mesyl-4,6-O-benzylidene-β-D - glucopyranosyl)purine*

To a solution of 7.1 g. of 2-methylmercapto-6-dimethylamino-9-(2-acetamido-2-deoxy-4,6-O-benzylidene-β - D - glucopyranosyl)purine in 71 cc. of pyridine was added dropwise 2.5 cc. of methane sulfonyl chloride. The solution was protected with a calcium chloride tube and heated at 50–52° C. for 20 hours. The solution was poured into 285 cc. of ice-water with stirring and the aqueous solution extracted with two 250 cc. portions of chloroform. The combined extracts, dried over magnesium sulfate, were evaporated to dryness under reduced pressure. Trituration with 100 cc. of absolute ethanol yielded 4.9 g. of 2-methylmercapto-6-dimethylamino - 9 - (2-acetamido-2-deoxy-3-mesyl-4,6-O-benzylidene-β-D-glucopyranosyl)purine as gray crystals, M. P. 201–202° C. dec.

EXAMPLE 65

*2-methylmercapto-6-dimethylamino-9-(2-acetamido-2-deoxy-4,6-O-benzylidene-β-D-allopyranosyl)purine*

A solution of 375 cc. of 95% aqueous methyl Cellosolve containing 15.7 g. of anhydrous sodium acetate and 6.3 g. of 2-methyl-mercapto-6-dimethylamino-9-(2-acetamido-2-deoxy-3-mesyl-4,6-O-benzylidene-β-D - glucopyranosyl)purine was refluxed for 20 hours. The solution was evaporated to dryness and the residue dissolved in a mixture of 140 cc. of water and 280 cc. of chloroform. The chloroform solution was separated and washed with 140 cc. of water. The organic layer, dried with magnesium sulfate, was evaporated to dryness under reduced pressure leaving a gum mixed with crystals. The residue was heated on a steam-bath with 50 cc. of toluene, then chilled in an ice-bath for 30 minutes. The product was washed with two 10 cc. portions of toluene. The yield of 2-methylmercapto-6-dimethylamino-9-(2-acetamido - 2 - deoxy-4,6-O-benzylidene-β-D-allopyranosyl)purine as white crystals, M. P. 229–231° C., dec., is 4.4 g.

EXAMPLE 66

*2-methylmercapto - 6 - dimethylamino - 9 - (2 - acetamido-2 - deoxy - 3 - O - acetyl - 4,6 - O-benzylidene-β-D-allopyranosyl)purine*

To a solution of 180 mg. of 2-methylmercapto-6-dimethylamino - 9 - (2 - acetamido - 2 - deoxy-4,6-O-benzylidene-β-D-allopyranosyl)purine in 1.8 cc. of pyridine was added 1.8 cc. of acetic anhydride. The solution was heated on the steam-bath for 90 minutes, then poured into 18 cc. of ice-water. The aqueous solution was extracted with two 10 cc. portions of chloroform and the combined extracts, dried with magnesium sulfate, were evaporated to dryness under reduced pressure. The residue was twice evaporated under reduced pressure with 10 cc. portion of toluene. The residual glass was crystallized from ethyl acetate-petroleum ether. The yield of 2-methylmercapto - 6 - dimethylamino - 9 - (2 - acetamido - 2 - deoxy - 3 - O - acetyl - 4,6 - O - benzylidene - β - D - allopyranosyl)purine as white crystals, M. P. 204–205° C., dec., is 150 mg.

EXAMPLE 67

*2-methylmercapto - 6 - dimethylamino - 9 - (2-acetamido-2-deoxy-3-O-acetyl-β-D-allopryanosyl)purine*

A solution of 500 mg. of 2-methylmercapto-6-dimethylamino-9-(2-acetamido - 2 - deoxy-3-O-acetyl-4,6-O-benzylidene-β-D-allopyranosyl)purine in 25 cc. of 95% methanol (containing 0.5% of concentrated hydrochloric acid) was refluxed for 30 minutes. When the solution was evaporated to dryness under reduced pressure there remained 400 mg of 2-methylmercapto-6-dimethylamino-9-(2-acetamido-2-deoxy-3-O-acetyl-β-D-allopyranosyl)purine as a tan glass.

EXAMPLE 68

*2-methylmercapto - 6 - dimethylamino - 9 - (2-acetamido-2-deoxy-3,4,6-tri-O-acetyl-β-D-allopyranosyl)purine*

To a solution of 350 mg. of 2-methylmercapto-6-dimethylamino-9-(2-acetamido - 2 - deoxy-3-O-acetyl-β-D-allopyranosyl)purine in 3.5 cc. of pyridine was added 3.5 cc. of acetic anhydride. The solution was heated on a steam-bath for 75 minutes, then cooled and stirred with 20 cc. of water for 15 minutes. The aqueous solution was extracted with two 15 cc. portions of chloroform. The combined extracts, dried with magnesium sulfate, were evaporated to dryness under reduced pressure. The evaporation was repeated with two 10 cc. portions of toluene and the residue crystallized from ethyl acetate. The yield of 2-methylmercapto-6-dimethylamino-9-(2-acetamido-2-deoxy-3,4,6-tri-O-acetyl-β-D - allopyranosyl)-purine as white crystals, M. P. 197–198° C., is 250 mg.

EXAMPLE 69

*6-dimethylamino-9-(2-acetamido-2-deoxy-3,4,6-tri-O-acetyl-β-D-allopyranosyl)purine*

A mixture of 2.5 g. of Amberlite IRC–50 (H) resin and 2.5 tspns. of Raney nickel (which had been deactivated by refluxing with acetone) in 50 cc. of absolute ethanol was stirred at room temperature for 10 minutes. To this mixture was added a solution of 1.23 g. of 2-methyl-mercapto - 6 - dimethylamino-9-(2-acetamido - 2 - deoxy-3,4,6-tri-O-acetyl-β-D-allopyranosyl)purine in 123 cc. of absolute ethanol. The reaction mixture was stirred and refluxed on the steam-bath until reaction was complete. The reaction mixture was filtered and the filtrate evaporated to dryness under reduced pressure to yield 300 mg. of 6-dimethylamino-9-(2-acetamido-2-deoxy-3,4,6-tri-O-acetyl-β-D-allopyranosyl)purine as a white glass.

EXAMPLE 70

*6-dimethylamino-9-(2-acetamido-2-deoxy-β-D-allopyranosyl)purine*

A solution of 480 mg. of 6-dimethylamino-9-(2-acetamido-2-deoxy-3,4,6-tri-O-acetyl - β - D - allopyranosyl)-purine in 9.6 cc. of methanol and 0.08 cc. of 1 N sodium methoxide in methanol was refluxed for 30 minutes. The solution was evaporated to dryness under reduced pressure and the residue crystallized from hot methanol by adding ethyl acetate. The yield of 6-dimethylamino-9-(2-acetamido-2-deoxy-β-D-allopyranosyl)purine as white crystals, M. P. 250–253° C. (dec.), is 315 mg.

EXAMPLE 71

*6-dimethylamino-9-(2-amino-2-deoxy-β-D-allopyranosyl)purine*

A solution of 150 mg. of 6-dimethylamino-9-(2-acetamido-2-deoxy-β-D-allopyranosyl)purine in 5 cc. of 0.5 N barium hydroxide solution is heated on a steam-bath for 8 hours. The solution was cooled, saturated with carbon dioxide gas, and filtered. The filtrate was evaporated to dryness under reduced pressure. The residue was dissolved in 5 cc. of absolute ethanol and the evaporation repeated leaving 160 mg. of a white glass. The residue was dissolved in 2 cc. of absolute alcohol and filtered. From the filtrate, by the addition of ethyl acetate, is obtained 85 mg. of 6-dimethylamino-9-(2-amino-2-deoxy-β-D-allopyranosyl)purine, M. P. 110–112°.

EXAMPLE 72

*Ethyl 2-acetamido-2-deoxy-3,5,6-tri-O-benzoyl-α-D-glucothiofuranoside*

In 3 cc. of reagent pyridine there was dissolved 0.50 g. of ethyl 2-acetamido-2-deoxy-α-D-glucothiofuranoside and the solution was cooled to 0–5° C. After the addition of 0.73 cc. of benzoyl chloride the reaction mixture was allowed to remain at 5° C., protected from atmospheric moisture, for 3 days. The dark solution was poured on 50 cc. of ice-water and was extracted with chloroform. The chloroform was washed with excess saturated sodium bicarbonate solution, then water, and dried over magnesium sulfate. The chloroform solution was filtered and evaporated to dryness under reduced pressure leaving a light orange gum which was clarified by activated charcoal in ether solution to give, on evaporation under reduced pressure, 1.0 g. of ethyl 2-acetamido-2-deoxy-3,5,6-tri-O-benzoyl-α-D-glucothiofuranoside as a colorless gum. Recrystallization from aqueous ethanol gave colorless crystals, M. P. 113–114° C.

EXAMPLE 73

*2-acetamido-2-deoxy-3,5,6-tri-O-benzoyl-D-glucofuranose*

A suspension of 6.9 g. of ethyl 2-acetamido-2-deoxy-3,5,6-tri-O-benzoyl-α-D-glucothiofuranoside and 20.0 g. of mercuric oxide in 69.0 cc. of acetone and 6.9 cc. of water was prepared. The mixture was magnetically stirred while a solution of 18.6 g. of mercuric chloride was added dropwise over 2 hours. After stirring for 48 hours at room temperature the mercuric oxide was removed by filtration through diatomaceous earth and the filtrate was evaporated to dryness under reduced pressure leaving a gum. The gum was dissolved in 15 cc. of water and extracted twice with 10 cc. portions of chloroform. The chloroform layer was separated and washed with 10 cc. of 30% potassium iodide and two 15 cc. portions of water. After drying over magnesium sulfate the chloroform solution was evaporated to dryness under reduced pressure leaving 6.0 g. of 2-acetamido-2-deoxy-3,5,6-tri-O-benzoyl-D-glucofuranose as a yellow gum which gave a positive Benedict test and showed 76.5% free sugar by the Hanes modification of the Hegadorn-Jensen procedure.

EXAMPLE 74

*1-O-acetyl-2-acetamido-2-deoxy-3,5,6-tri-O-benzoyl-D-glucofuranose*

To a solution of 0.5 g. of 2-acetamido-2-deoxy-3,5,6-tri-O-benzoyl-D-glucofuranose in 5 cc. of pyridine was added 5 cc. of acetic anhydride and the solution was allowed to remain at room temperature, protected from atmospheric moisture, for 18 hours. After pouring on 50 cc. of ice-water the mixture was extracted several times with chloroform. The chloroform extracts were combined and washed with excess saturated sodium bicarbonate and then with water. After drying over magnesium sulfate the chloroform solution was evaporated to dryness under reduced pressure leaving a dark gum which was clarified by treating with activated charcoal in absolute ether. On reevaporation of 450 mg. of 1-O-acetyl-2-acetamido-2-deoxy-3,5,6-tri-O-benzoyl-D-glucofuranose was obtained as a light yellow gum.

EXAMPLE 75

*6-chloro-9-(2-acetamido-2-deoxy-3,5,6-tri-O-benzoyl-β-D-glucofuranosyl)purine*

In 25 cc. anhydrous ether, saturated at 0° C. with hydrogen chloride, 2.0 g. of 1-O-acetyl-2-acetamido-2-deoxy-3,5,6-tri-O-benzoyl-D-glucofuranose was dissolved. Then 2.0 cc. of acetyl chloride was added. The resulting solution was kept at —5° C., protected from atmospheric moisture, for 3 days and then was evaporated to dryness under reduced pressure at a water bath temperature of 40–45° C. Reagent benzene was added and evaporation was repeated leaving a light pink solid, M. P. 78–82° C., dec. In 250 cc. of xylene there was suspended 2.7 g. of 6-chloropurine mercuric chloride reaction product and there was removed by distillation about 80 cc. of xylene. To the mixture with magnetic slurring was added the above light pink solid and the whole reaction was stirred for 3 hours in refluxing xylene. After filtration the filtrate on evaporation to dryness under reduced pressure gave a gum which was redissolved in chloroform and washed with 30% potassium iodide. After one water wash the chloroform solution was evaporated to dryness leaving 2.0 g. of 6-chloro-9-(2-acetamido-2-deoxy-3,5,6-tri-O-benzoyl-β-D-glucofuranosyl)purine as a dark brown gum.

EXAMPLE 76

*6-dimethyl-9-(2-acetamido-2-deoxy-β-D-glucofuranosyl)-purine*

A solution of 2.0 g. of 6-chloro-9-(2-acetamido-2-deoxy-3,5,6-tri-O-benzoyl-β-D-glucofuranosyl)purine, 3 cc. of dimethylamine and 25 ml. of reagent methanol in a steel autoclave was heated for 2 hours on a steam-bath, cooled and the contents evaporated to dryness under reduced pressure. The resulting gum was dissolved in 25 cc. of water and impurities were removed by filtration and extraction of the filtrate with ether. On evaporation of the aqueous solution to dryness under reduced pressure there remained 0.8 g. of 6-dimethylamino-9-(3-acetamido-3-deoxy-β-D-glucofuranosyl)purine; U. V. maxima: 268 mμ(PH), 278 mμ(pH7), 278 mμ(pH14).

EXAMPLE 77

*3-amino-3-deoxy-D-altrose diethylmercaptal*

A solution of 5.0 g. of methyl 3-amino-3-deoxy-4,6-benzylidene-α-D-altropyranoside in 10 cc. of concentrated hydrochloric acid was chilled in an ice-bath and 10 cc. of ethyl mercaptan was added. The mixture was shaken for 20 hours. The acid layer was separated, washed with two 10 cc. portions of benzene, diluted with 20 cc. of absolute ethanol and neutralized with basic lead carbonate. The mixture was filtered and the precipitate washed with three 10 cc. portions of absolute ethanol. The combined filtrate and washings were evaporated to dryness under reduced pressure at a bath temperature of 50° C. The residual gum was dissolved in 25 cc. of absolute ethanol and the evaporation repeated, leaving 2.0 g. of 3-amino-3-deoxy-D-altrose diethylmercaptal as an amber gum.

EXAMPLE 78

*2,4,5,6-tetra-O-acetyl-3-acetamido-3-deoxy-D-altrose diethylmercaptal*

A solution of 850 mg. of 3-amino-3-deoxy-D-altrose diethylmercaptal in 10 cc. of 1:1 pyridine:acetic anhydride solution was heated on a steam-bath for 2 hours. The solution was poured into 25 cc. of ice-water and stirred for 20 minutes. The aqueous solution was extracted with two 15 cc. portions of chloroform and the combined chloroform extracts were dried over magnesium sulfate and evaporated to dryness under reduced pressure. The residue was dissolved in 10 cc. of toluene and the evaporation repeated to leave 1.2 g. of 2,4,5,6-tetra-O-acetyl-3-acetamido-3-deoxy-D-altrose diethylmercaptal.

EXAMPLE 79

*3-acetamido-3-deoxy-D-altrose diethylmercaptal*

A solution of 1.2 g. of 2,4,5,6-tetra-O-acetyl-3-acetamido-3-deoxy-D-altrose diethylmercaptal in 10 cc. of methanol and 0.63 cc. of 1 N sodium methoxide in methanol was refluxed for 30 minutes. The solution was evaporated to dryness under reduced pressure. The residue was triturated with 10 cc. of 10:1 ethyl acetate:heptane and cooled in an ice-bath for 30 minutes. The crystals were collected and washed with 3 cc. of 10:1 ethyl acetate:heptane. The yield of 3-acetamido-3-deoxy-D-altrose diethylmercaptal as white crystals, M. P. 133–135° C., was 410 mg.

EXAMPLE 80

*3-acetamido-3-dioxy-6-O-trityl-D-altrose diethylmercaptal*

A solution of 10.0 g. of 3-acetamido-3-deoxy-D-altrose diethylmercaptal and 9.3 g. of triphenylchloromethane in 80 cc. of pyridine was kept at 37° for 6 hours, then diluted with 400 cc. of chloroform. The chloroform solution was washed with 400 cc. of saturated aqueous sodium bicarbonate solution, dried over magnesium sulfate and evaporated to dryness under reduced pressure at a bath temperature of 50° C. The residue was dissolved in 100 cc. of toluene and the evaporation repeated (bath 50° C.) leaving an amber gum weighing 22.5 g. The gum was dissolved in 200 cc. of methanol and 50 cc. of water added with seeding and scratching. After standing at 3° C. for 20 hours, a small amount of gum separated. The supernatant liquid was decanted and to it was added water to turbidity. The solution, after standing in an ice-bath for 3 hours, deposited white crystals. The crystals were collected and washed with 50 cc. of 4:1 methanol:water solution. The crystals were dried under reduced pressure at 50° C. to constant weight. The yield of 3-acetamido-3-deoxy-6-O-trityl-D-altrose diethylmercaptal as white crystals, M. P. 91–92° C., was 9.05 g. A 15% recovery of starting material is recovered from the filtrates.

EXAMPLE 81

*3-acetamido-3-deoxy-6-O-trityl-D-altropyranose*

To a solution of 9.0 g. of 3-acetamido-3-deoxy-6-trityl-D-altrose diethylmercaptal in 250 cc. of 10% aqueous acetone was added 20.5 g. of mercuric oxide. To this suspension was added a solution of 23.4 g. of mercuric chloride in 85 cc. of acetone and the mixture was shaken for 20 hours, then filtered through diatomaceous earth. The filtrate was evaporated to dryness under reduced pressure. The residual gum was shaken with a mixture of 500 cc. of chloroform and 500 cc. of 40% potassium iodide solution. The chloroform solution was separated, dried over magnesium sulfate and evaporated to dryness under reduced pressure to yield 10.4 g. of 3-acetamido-3-deoxy-6-O-trityl-D-altropyranose as a white gum.

EXAMPLE 82

*2-acetamido-2-deoxy-4-O-formyl-5-O-trityl-D-ribose*

To a stirred solution of 10.4 g. of 3-acetamido-3-deoxy-6-O-trityl-D-altropyranose in 250 cc. of methylene chloride was added 4.5 g. of lead tetraacetate. After stirring for 1 hour, an additional 4.5 g. of lead tetraacetate was added and the solution was stirred for 45 minutes. Excess oxidizing agent was destroyed by the addition of 10 cc. of ethylene glycol and stirring for 10 minutes. The solution was washed with two 200 cc. portions of water and with 100 cc. of 5% sodium thiosulfate solution. The methylene chloride solution was dried over magnesium sulfate and evaporated to dryness under reduced pressure leaving an amber glass weighing 8.3 g. The glass was dissolved in 50 cc. of warm toluene and kept at 3° C. for 20 hours. The 2-acetamido-2-deoxy-4-O-formyl-5-O-trityl-D-ribose, washed with two 5 cc. portions of toluene, weighed 2.55 g., M. P. 140–143° C.

EXAMPLE 83

*2-acetamido-2-deoxy-5-O-trityl-D-ribofuranose*

A solution of 2-acetamido-2-deoxy-4-O-formyl-5-O-trityl-D-ribose (2.0 g.) in 40 cc. of methanol and 7.0 cc. of 10% sodium hydroxide solution was allowed to stand at room temperature for 30 minutes. After dilution with 165 cc. of water, the solution was extracted with two 150 cc. portions of chloroform. The combined extracts, dried over magnesium sulfate, were evaporated to dryness under reduced pressure leaving 1.9 g. of 2-acetamido-2-deoxy-5-O-trityl-D-rigofuranose as an amber gum.

EXAMPLE 84

*1,3-di-O-acetyl-2-acetamido-2-deoxy-5-O-trityl-D-ribofuranose*

A solution of 1.9 g. of 2-acetamido-2-deoxy-5-O-trityl-D-ribose in 44 cc. of 1:1 acetic anhydride-pyridine mixture was heated on the steam-bath for 2 hours, then poured into 170 cc. of ice-water with stirring. The aqueous solution was extracted with two 125 cc. portions of chloroform and the combined extracts dried over magnesium sulfate. The extracts were evaporated to dryness under reduced pressure, the residual oil dissolved in 40 cc. of toluene and the evaporation repeated leaving 2.23 g. of 1,3-di-O-acetyl-2-acetamido-2-deoxy-5-O-trityl-D-ribofuranose as an amber gum.

EXAMPLE 85

*2-amino-2-deoxy-α and β-D-ribofuranose tetraacetate*

A solution of 1.8 g. of 1,3-di-O-acetyl-2-acetamido-2-deoxy-5-O-trityl-D-ribofuranose in 18 cc. of 80% acetic acid was heated on a steam-bath for 20 minutes. The solution was cooled and 38 cc. of acetic anhydride was added. After stirring for 5 minutes, 5.5 cc. of pyridine was added and the solution was heated for 2 hours. The solution was stirred with 190 cc. of ice-water for 15 minutes. The aqueous solution was decanted from some gummy material and extracted with two 135 cc. portions of chloroform. The combined chloroform extracts are washed with excess sodium bicarbonate solution, dried over magnesium sulfate and evaporated to dryness under reduced pressure. The residual oil was dissolved in 20 cc. of toluene and the evaporation repeated leaving an amber gum weighing 900 mg. Crystallization from ethyl acetate-heptane gave 160 mg. of 2-amino-2-deoxy-β-D-ribofuranose tetraacetate as white crystals, M. P. 156–157° C. Evaporation of the filtrate gave mixed 2-amino-2-deoxy-α and β-ribofuranose tetraacetate as a gum weighing 680 mg.

EXAMPLE 86

*2-methylmercapto-6-dimethylamino-9-(2-acetamido-2-deoxy-3,5-di-O-acetyl-β-D-ribofuranosyl)purine*

To a solution of 200 mg. of 2-amino-2-deoxy-D-ribofuranose tetraacetate in 50 cc. of ethylene dichloride was added 352 mg. of 2-methylmercapto-6-dimethylamino mercuric chloride reaction product and 388 mg. of diatomaceous earth. The mixture was freed of water by the azeotropic distillation of 25 cc. of the solvent. The solution was cooled and 0.085 cc. of titanium tetrachloride in 5 cc. of ethylene dichloride was added. The solution was stirred and refluxed for 17 hours. To the solution was added 25 cc. of water and the mixture was stirred an additional 15 minutes. The solution was filtered and the filter cake washed several times with hot chloroform. The organic layer was separated and evaporated to dryness under reduced pressure. The residual gum was dissolved in 20 cc. of chloroform and washed with 20 cc. of 30% potassium iodide and then with water. After clarifying with activated charcoal and drying over magnesium sulfate, the solution was evaporated to dryness under reduced pressure leaving 160 mg. of 2-methylmercapto-6-dimethylamino-9-(2-acetamido-2-deoxy - 3,5-di-O-acetyl-β-D-ribofuranosyl)purine as a brown gum, soluble in methyl cellosolve and chloroform and insoluble in water and heptane.

EXAMPLE 87

*2-methylmercapto-6-dimethylamino-9-(2-acetamido-2-deoxy-β-D-ribofuranosyl)purine*

To a solution of 150 mg. of 2-methylmercapto-6-dimethylamino-9-(2-amino-2-deoxy - β - D-ribofuranosyl)-purine triacetate in 3.0 cc. of absolute ethanol was added 0.08 cc. of 1 N sodium methoxide in methanol. The solution was refluxed for 30 minutes. Upon evaporation to dryness under reduced pressure, there remained 95 mg. of a brown glass which was purified by chromatography which gave 45 mg. of 2-methylmercapto-6-dimethylamino-9-(2-acetamido-2-deoxy-β-D-ribofuranosyl)purine; U. V. maxima, 246 mμ (pH 7, 14), 286 mμ (pH 7, 14), 275 mμ (pH 1). The product is soluble in ethanol and methanol and insoluble in ethyl acetate and heptane.

EXAMPLE 88

*1,2,4,6-tetra-O-acetyl-3-acetamido-3-deoxy-D-allopyranoside*

To a solution of 25 g. of methyl 2,4,6-tri-O-acetyl-3-acetamido-3-deoxy-α-D-allopyranoside and 250 cc. of acetic anhydride cooled in an ice-bath was added 5 cc. of concentrated sulfuric acid dropwise with shaking. The stoppered solution was allowed to stand at room temperature for 7 days. The reaction mixture was poured into approximately 1300 cc. of ice-water and stirred for approximately 30 minutes to decompose the acetic anhydride. The solution was saturated with sodium chloride and extracted with three 200 cc. portions of chloroform. The combined extracts were dried with anhydrous magnesium sulfate, filtered, and the filtrate was evaporated to dryness under reduced pressure. The residue was evaporated three times with toluene, leaving 20.8 g. of 1,2,4,6-tetra-O-acetyl-3-acetamido-3-deoxy-D-allopyranoside as a buff colored syrup.

EXAMPLE 89

*2-methylmercapto-6-dimethylamino-9-(2,4,6-tri-O-acetyl-3-acetamido-3-deoxy-β-D-allopyranosyl)purine*

To a cooled, stirred mixture of 5 g. of 2-methylmercapto-6-dimethylaminopurine mercuric chloride reaction product, 5.5 g. of diatomaceous earth, 3.5 g. of 1,2,4,6-tetra-O-acetyl-3-acetamido-3-deoxy-D-allopyranoside and 200 cc. of ethylene dichloride, which was freed from moisture by distillation of 50 cc. of solvent, was added a solution of 1.21 cc. of titanium tetrachloride in 20 cc. of ethylene dichloride. The mixture turned brown and almost immediately thereafter became a lighter color due to the separation of a fine precipitate. The mixture was stirred under reflux for 17 hours. To the somewhat cooled mixture was added 150 cc. of water and stirring was continued for 30 minutes. The mixture was filtered and the filter cake was washed with four 50 cc. portions of boiling chloroform. The organic layer was separated and evaporated to dryness under reduced pressure leaving a brown glass. The residue was dissolved in 50 cc. of chloroform and washed with 50 cc. of 30% aqueous potassium iodide and then with water. The solution was dried with anhydrous magnesium sulfate, clarified with activated charcoal and evaporated to dryness under reduced pressure to afford 1.8 g. of crude 2-methylmercapto-6-dimethylamino-9 - (2,4,6-tri-O-acetyl-3-acetamido-3-deoxy-β-D-allopyranosyl)purine as a glass; U. V. maxima: 248 mμ, 283 mμ (ethanol).

EXAMPLE 90

*6-chloro-9-(2,4,6-tri-O-acetyl-3-acetamido-3-deoxy-β-D-allopyranosyl)purine*

A mixture of 19.7 g. of 6-chloropurine mercuric chloride reaction product, 17.8 g. of diatomaceous earth, 20.7 g. of 3-amino-3-deoxy-D-allopyranoside pentaacetate and 750 cc. of ethylene dichloride was freed from traces of water by distillation of 100 cc. of solvent. To the somewhat cooled, stirred mixture was added a solution of 6.4 cc. of titanium tetrachloride in 100 cc. of ethylene dichloride over a period of about 2 minutes. The mixture was refluxed and stirred for 20 hours, then diluted with 400 cc. of 1 N hydrochloric acid and stirred for 1 hour without further heating. The mixture was filtered and the filter cake washed with hot chloroform. The organic layer was separated from the combined filtrate and washings, then evaporated to dryness under reduced pressure. A solution of the residue in 100 cc. of chloroform was washed with 100 cc. of 30% aqueous potassium iodide followed by water. After being dried with anhydrous magnesium sulfate, the solution was evaporated to dryness under reduced pressure leaving 5.5 g. of 6-chloro-9-(2,4,6-tri-O-acetyl-3-acetamido-3-dexoy-β-D - allopyranosyl)purine as a glass.

EXAMPLE 91

*6-dimethylamino-9-(3-acetamido-3-deoxy-β-D-allopyranosyl)purine*

A solution of 5.5 g. of 6-chloro-9-(2,4,6-tri-O-acetyl-3-acetamido-3-deoxy-β-D-allopyranosyl)purine, 120 cc. of absolute methanol and 8 cc. of anhydrous dimethylamine, contained in a steel bomb was heated on a steam-bath for 2 hours. The solution was then evaporated to dryness under reduced pressure leaving 5 g. of 6-dimethylamino-9-(3-acetamido - 3 - deoxy-β-D-allopyranosyl)purine as a brown syrup.

$\lambda_{max.}^{0.1\ N\ HCl}$ 268 mμ (ε6,200); $\lambda_{max.}^{ethanol}$ 278 mμ (ε6,600); $\lambda_{max.}^{0.1\ N\ NaOH}$ 279 mμ (ε6,600)

EXAMPLE 92

6-dimethylamino-9-(3-amino-3-deoxy-β-D-allopyranosyl)purine

A solution of 5 g. of 6-dimethylamino-9-(3-acetamido-3-deoxy-β-D-allopyranosyl)purine and 250 cc. of approximately 0.5 N barium hydroxide was heated on a steam-bath for 1 hour. The cooled solution was treated with carbon dioxide until no more barium carbonate was precipitated. The filtered solution was then passed through a 12 x 3 cm. column packed with Amberlite IRC–50 (H) resin. A total eluant fraction of 1600 cc. was collected, the column having been continually washed with 50% aqueous methanol until no more 9-substituted purine was being washed out, according to ultraviolet data. According to ultraviolet data this neutral fraction contained 579 mg. of a 9-substituted purine. The column is then washed with 2 N methanolic ammonium hydroxide. Six 100 cc. fractions are removed, the last showing only a small amount of a 9-substituted purine by ultraviolet data. The total amount contained in the fractions, according to U. V., is 420 mg. of product. Evaporation of these eluant fractions affords 770 mg. of a tan glass, $\lambda_{max.}^{0.1\ N\ HCl}$ 268 mμ (ε9,600), $\lambda_{max.}^{ethanol}$ 276 mμ (ε9,900), $\lambda_{max.}^{0.1\ N\ NaOH}$ 276 mμ (ε10,000)

For purification the material (675 mμ) was partitioned on diatomaceous earth in a butanol-ethyl acetate system to afford 475 mg. of a glass, $\mu_{max.}^{0.1\ N\ HCl}$ 268 mμ (ε14,800), $\lambda_{max.}^{ethanol}$ 275 mμ (ε14,800), $\lambda_{max.}^{0.1\ N\ NaOH}$ 275 mμ (ε15,200)

Crystallization from absolute ethanol afforded 107 mg. of 6 - dimethylamino - 9 - (3 - amino-3-deoxy-β-D - allopyranosyl)purine hemi-hydrate as white crystals, M. P. 178–180° C.; $[\alpha]_D^{25}$—17.9° (water);

$\lambda_{max.}^{0.1\ N\ HCl}$ 268 mu (ε17,900); $\lambda_{max.}^{ethanol}$ 275 mμ (ε18,000); $\lambda_{max.}^{0.1\ N\ NaOH}$ 275 mμ (ε18,100)

EXAMPLE 93

2-methylmercapto-6-dimethylamino-9(3-acetamido-3-deoxy-β-D-arabinofuranosyl)purine To a solution of 100 mg. of 2-methylmercapto-6-dimethylamino-9-(3-amino-3-deoxy- β-D-arabinofuranosyl) purine, 0.25 cc. of water and 0.25 cc. of glacial acetic acid was added 0.042 cc. (1.5 mole) of acetic anhydride. The solution was shaken and allowed to stand at room temperature for approximately 8 minutes. The solution was evaporated to dryness under reduced pressure affording a glassy residue. Trituration with hot ethyl acetate transformed the glass into a white crystalline substance; yield of 2-methylmercapto-6-dimethylamino-9(3-acet-amido-3-deoxy-β - D - arabinofuranosyl)purine 88 mg. (79%); M. P. 191–192°. Recrystallization from ethyl acetate-absolute ethanol afforded white crystals; M. P. 193–195°; $[\alpha]_D^{25}$+13° (2% in puridine).

EXAMPLE 94

6-benzamido-9-(2,5-di-O-benzoyl-3-phthalimido-3deoxy-β-D-ribofuranosyl)purine A mixture of 7.3 g. of 1-acetyl-2,5-di-O-benzoyl-3-deoxy-3-phthalimido-D-ribofuranoside and 7.3 cc. of acetyl chloride was warmed with swirling until solution was complete. With ice-bath cooling there was added 150 cc. of absolute ether saturated with hydrogen chloride. In a few minutes white crystals separated. The mixture, protected by a calcium chloride drying tube was kept at —3° C. for 3 days. The reaction mixture was evaporated to dryness at reduced pressure from a 35–40° water bath leaving a white solid mass. The material was evaporated with benzene twice to remove traces of acetyl chloride. Yield of white crystals 7.0 g. (100%); M. P. 160–162° (gas). These crystals were then dissolved in 150 cc. of warm xylene. The solution was added to a hot stirred mixture of 9.0 g. of diatomaceous earth, 7.2 g. (1.1 mols) of 6-benzamidopurine mercuric chloride and 400 cc. of xylene which had previously been freed from moisture by distillation of 100 cc. of solvent. The mixture was stirred under reflux for 3 hours. The hot solution was then filtered, and the cake washed with 50 cc. of hot toluene. The mother liquor was evaporated to dryness under reduced pressure leaving a syrup. The diatomaceous earth cake was boiled with 100 cc. of chloroform, filtered, and the filtrate was used to dissolve the syrupy residue left on evaporation of the xylene solution. This chloroform solution was washed with 100 cc. of 30% aqueous potassium iodide and then with water. After drying with magnesium sulfate and filtering, the filtrate was evaporated to dryness at reduced pressure affording 9.4 g. (96%) of 6-benzamido-9-(2,5-di-O-benzoyl-3-phthalimido-3-deoxy- β-D-ribofuranosyl)purine as a glass.

EXAMPLE 95

9-(3-phthalimido-3-deoxy-β-D-ribofuranosyl)adenine

To a hot mixture of 3.3 g. of 6-benzamido-9-(2,5-di-O-benzoyl-3-phthalimido-3-deoxy-β -D-ribofuranosyl)purine and 6.6 cc. of absolute methanol was added 5.15 cc. (1.1 mols) of 1 N methanolic sodium methoxide. The mixture was refluxed on a steam-bath for 40 minutes; solution being complete after 2 minutes. Evaporation to dryness at reduced pressure afforded a solid mixed with a syrup. This residue was triturated with ether two times, decanting after each. The remaining solid was dried by evaporation to dryness under reduced pressure. The solid was dissolved in 19.8 cc. of dimethylformamide and to the solution was added 0.54 cc. (2 mols) of glacial acetic acid. The solution was refluxed for 30 minutes, during which time the solution became dark. Evaporation to dryness under reduced pressure afforded 1.08 g. (58%) of a partially crystalline dark syrup. Recrystallization of 880 mg. of the crude product from 90 cc. of water afforded 540 mg. (36%) of 9-(3-phthalimido-3-deoxy-β-D-ribofuranosyl)-adenine as buff-colored crystals; M. P. 228–229°; $[\alpha]_D^{24}$—175° (0.6% in EtOH).

This application is in part a continuation of our co-pending application Serial No. 405,236, filed January 20, 1954, now abandoned.

We claim:

1. Aminodeoxyglycosidopurines of the formula:

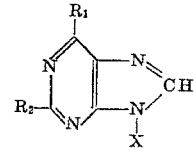

wherein $R_1$ and $R_2$ are members of the group consisting of halogen, hydrogen, alkyl, hydroxyl, alkoxy, aralkyl-oxy, mercapto, alkylmercapto, amino, alkylamino, mono-nuclear arylamino, aralkylamino, heterocyclic-alkylamino, dialkylamino, pentamethyleneimino, oxapentamethylene-imino, dialkenylamino and cycloalkylamino radicals, and wherein X is an aminodeoxyglycosido radical, the amino group of which is substituted by a member of the group consisting of hydrogen, acetyl and phthaloyl radicals, and the exocyclic oxygen atoms of which are substituted by a member of the group consisting of hydrogen, acetyl and benzoyl radicals.

2. The compounds of claim 1 in which X is an amino-deoxyglycofuranosido radical.

3. The compounds of claim 1 in which X is an aminodeoxyribofuranosido radical.

4. The compounds of claim 1 in which X is the 3-amino-3-deoxy-β-D-ribofuranosido radical.

5. 6 - substituted - amino - 9 - (aminodeoxypentofuranosido)purines.

6. 6 - substituted - amino - 9 - (3 - amino - 3 - deoxypentofuranosido)purines.

7. 6 - substituted - amino - 9 - (3 - amino - 3 - deoxy-β-D-ribofuranosyl)purines.

8. 6 - dialkylamino - 9 - (aminodeoxypentofuranosido)-purines.

9. 6-amino-9-(aminodeoxypentofuranosido)purines.

10. 6-hydroxy-9-(aminodeoxypentofuranosido)purines.

11. 6 - mercapto - 9 - (aminodeoxypentofuranosido)purines.

12. 6-dialkylamino-9-(3-amino-3-deoxy-β-D-ribofuranosyl)purines.

13. 6 - alkylamino - 9 - (3 - amino - 3 - deoxy - β - D-ribofuranosyl)purines.

14. 6 - heterocyclicalkylamino - 9 - (3 - amino - 3 - deoxy-β-D-ribofuranosyl)purines.

15. 6 - alkoxy - 9 - (3 - amino - 3 - deoxy - β - D - ribofuranosyl)purines.

16. 6 - dimethylamino - 9 - (3 - amino - 3 - deoxy - β-D-ribofuranosyl)purine.

17. 6 - dipropylamino - 9 - (3 - amino - 3 - deoxy - β-D-ribofuranosyl)purine.

18. 6 - amino - 9 - (3 - amino - 3 - deoxy - β - D - ribofuranosyl)purine.

19. 6 - diethylamino - 9 - (3 - amino - 3 - deoxy - β-D-ribofuranosyl)purine.

20. 6 - isobutylamino - 9 - (3 - amino - 3 - deoxy - β-D-ribofuranosyl)purine.

21. In the process of preparing aminodeoxyglycosidopurines, the step which comprises reacting a heavy metal salt of a purine and a fully acylated aminodeoxy sugar with titanium tetrachloride in the presence of an inert non-hydroxylic solvent.

22. In the process of preparing aminodeoxyglycosidopurines, the step which comprises treating an acylaminodeoxyglycosidopurine in which the hydroxyl group adjacent and trans to the acylamino group is substituted with an organic sulfonyl group, with a basic reagent in a compatible solvent, and hydrolyzing the resulting compound to form an acylaminodeoxyglycosidopurine in which the adjacent hydroxyl group is now cis.

References Cited in the file of this patent

Davoll et al.: J. Am. Chem. Soc., 73, 1650–5, (1951); 74, 1563–6 (1952).
Waller et al.: J. Am. Chem. Soc., 75, 20–25 (1953).
Porter et al.: Antibiotics and Chemotherapy, II, 409–10 (1952).